(12) United States Patent
Yu et al.

(10) Patent No.: US 11,171,489 B2
(45) Date of Patent: Nov. 9, 2021

(54) CONTROL METHOD AND CONTROLLER FOR STRING INVERTER, INVERTER, AND INVERTER SYSTEM

(71) Applicant: Huawei Technologies Co., Ltd., Shenzhen (CN)

(72) Inventors: Xinyu Yu, Shanghai (CN); Kai Xin, Shanghai (CN); Fangcheng Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/073,864

(22) Filed: Oct. 19, 2020

(65) Prior Publication Data
US 2021/0036520 A1 Feb. 4, 2021

Related U.S. Application Data

(63) Continuation of application No. PCT/CN2019/074686, filed on Feb. 3, 2019.

(30) Foreign Application Priority Data

Jun. 15, 2018 (CN) .......................... 201810621957.6

(51) Int. Cl.
*H02J 3/38* (2006.01)
(52) U.S. Cl.
CPC ........... *H02J 3/381* (2013.01); *H02J 2300/24* (2020.01)
(58) Field of Classification Search
CPC ...................................................... H02J 3/381
USPC ............................................................ 307/82
See application file for complete search history.

(56) References Cited

U.S. PATENT DOCUMENTS

| | | | |
|---|---|---|---|
| 2008/0143188 A1* | 6/2008 | Adest ...................... | H02J 3/383 307/82 |
| 2014/0049115 A1 | 2/2014 | Adest et al. | |
| 2016/0099676 A1 | 4/2016 | Fornage | |
| 2017/0012436 A1 | 1/2017 | Mende et al. | |
| 2018/0115165 A1 | 4/2018 | Yamaguchi et al. | |
| 2018/0234051 A1 | 8/2018 | Ni et al. | |
| 2018/0375471 A1 | 12/2018 | Yang et al. | |

FOREIGN PATENT DOCUMENTS

| | | |
|---|---|---|
| CN | 104009705 A | 8/2014 |
| CN | 105391401 A | 3/2016 |
| CN | 105680797 A | 6/2016 |

(Continued)

*Primary Examiner* — Joseph Chang
(74) *Attorney, Agent, or Firm* — Conley Rose, P.C.

(57) ABSTRACT

A control method for a string inverter, comprising: in a current/voltage (IV) curve scanning process, controlling an output power of an inverter circuit to be a specified power reference value, and controlling an output voltage of each non-IV curve scanning direct current (DC) to DC (DC-DC) circuit to be a specified voltage reference value, where the specified power reference value is less than or equal to a sum of input powers of all non-IV curve scanning DC-DC circuits the before IV curve scanning process, and where the specified voltage reference value is greater than or equal to a preset percentage of a maximum value in open-circuit voltages, before the IV curve scanning process, of photovoltaic strings connected to all IV curve scanning DC-DC circuits.

20 Claims, 10 Drawing Sheets

(56) References Cited

FOREIGN PATENT DOCUMENTS

| | | | |
|---|---|---|---|
| CN | 105827200 | A | 8/2016 |
| CN | 105871324 | A | 8/2016 |
| CN | 106357220 | A | 1/2017 |
| CN | 106712716 | A | 5/2017 |
| CN | 106899268 | A | 6/2017 |
| CN | 107017836 | A | 8/2017 |
| CN | 107196604 | A | 9/2017 |
| CN | 107612019 | A | 1/2018 |
| CN | 106130480 | B | 2/2018 |
| CN | 107689772 | A | 2/2018 |
| CN | 107800384 | A | 3/2018 |
| CN | 108879756 | A | 11/2018 |
| EP | 2658071 | A2 | 10/2013 |
| JP | 2014038961 | A | 2/2014 |
| WO | 2013015921 | A1 | 1/2013 |
| WO | 2016073893 | A1 | 5/2016 |

* cited by examiner

CONTROL METHOD AND CONTROLLER FOR STRING INVERTER, INVERTER, AND INVERTER SYSTEM

CROSS-REFERENCE TO RELATED APPLICATIONS

The application is a continuation of International Patent Application No. PCT/CN2019/074686, filed on Feb. 3, 2019, which claims priority to Chinese Patent Application No. 201810621957.6 filed on Jun. 15, 2018. The disclosures of the aforementioned applications are hereby incorporated by reference in their entireties.

TECHNICAL FIELD

The application relates to the field of power electronic technologies, and in particular, to a control method and a controller for a string inverter, an inverter, and an inverter system.

BACKGROUND

With shortage of conventional energy sources and intensification of global pollution, clean energy sources with no pollution, such as wind power and solar power, are increasingly used currently. The solar power is also referred to as photovoltaic power.

The following first describes technical terms related to the photovoltaic power.

Photovoltaic module: The photovoltaic module is a direct current power supply formed by packaging solar cells that are connected in series or parallel. The solar cells can convert solar energy into electric energy.

Photovoltaic string: The photovoltaic string is a direct current power supply formed by connecting positive electrodes and negative electrodes of a plurality of photovoltaic modules head-to-tail in series.

String inverter: The string inverter includes an inverter circuit and at least two direct current (DC) to DC (DC-DC) converter circuits, and output ends of all DC-DC circuits are connected in parallel to an input end of the inverter circuit. The DC-DC circuit is configured to convert a direct current into a direct current, for example, voltage boosting. The inverter circuit is configured to convert a direct current into an alternating current, to perform grid-connected power generation or supply power to a load. An input end of each DC-DC circuit corresponds to at least two photovoltaic strings, and output ends of the photovoltaic strings are connected in parallel to the input end of the DC-DC circuit.

A health status of a photovoltaic string directly determines electric energy that can be generated by a photovoltaic inverter system. When a temperature and light intensity are specified, an output current of a photovoltaic string varies with an output voltage, and a current-voltage (I-V) curve (which is also referred to as an IV curve) can be drawn. An IV curve of a healthy photovoltaic string is a parabolic curve. An IV curve of a photovoltaic string can be drawn when an output voltage of the photovoltaic string is scanned from an open-circuit voltage to a short-circuit voltage. This process is referred to as IV curve scanning of the photovoltaic string. If a photovoltaic string is damaged or a photovoltaic string is covered, an IV curve of the photovoltaic string distorts. Therefore, a health status of a photovoltaic string can be diagnosed through IV curve scanning, to provide a basis for photovoltaic string operation and maintenance.

Specifically, because an output end of the photovoltaic string is connected to an input end of a DC-DC circuit, an input voltage of the DC-DC circuit may be controlled to be scanned from the open-circuit voltage to the short-circuit voltage to implement the IV curve scanning process.

In other approaches, in an IV curve scanning process for a photovoltaic string, a photovoltaic string for which IV curve scanning is performed currently is in an IV curve scanning mode, to be specific, a DC-DC circuit that is connected to the photovoltaic string controls an output voltage of the photovoltaic string to be scanned from an open-circuit voltage to a short-circuit voltage. In this process, the photovoltaic string for which IV curve scanning is performed outputs a fluctuating power; and a photovoltaic string on which scanning is not performed does not output a power, and outputs a current that is controlled to be 0 by a DC-DC circuit that is connected to the photovoltaic string. Consequently, an output power of the photovoltaic inverter system is greatly reduced, and an energy yield loss is relatively high. In addition, an output power of an inverter circuit fluctuates. This affects stability of a power grid, and may even cause a power grid failure.

SUMMARY

To resolve the foregoing technical problems in other approaches, the present disclosure provides a control method and a controller for a string inverter, an inverter, and an inverter system, to reduce an energy yield loss in an IV curve scanning process, and reduce impact on stability of a power grid because an output power of an inverter circuit is stable and does not fluctuate.

According to a first aspect, a control method for a string inverter is provided, where the method is applied to the string inverter. The string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit. The method includes: in an IV curve scanning process, controlling an output power of the inverter circuit to be a specified power reference value, and controlling an output voltage of each non-IV curve scanning DC-DC circuit to be a specified voltage reference value, where the specified power reference value is less than or equal to a sum of input powers of all non-IV curve scanning DC-DC circuits before IV curve scanning, and the specified voltage reference value is greater than or equal to a preset percentage of a maximum value in open-circuit voltages, before the IV curve scanning, of photovoltaic strings connected to all IV curve scanning DC-DC circuits.

In the IV curve scanning process, the inverter circuit is controlled to maintain a constant output power and a constant bus voltage. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. In the method provided in this embodiment of this application, each non-IV curve scanning DC-DC circuit is controlled to continue to output a power. In this way, electric energy output by each non-IV curve scanning DC-DC circuit can be effectively utilized, and a huge energy yield loss can be avoided.

In a first possible implementation of the first aspect, before the IV curve scanning, the method further includes: obtaining the sum of the input powers of all non-IV curve scanning DC-DC circuits.

With reference to any one of the first aspect or the foregoing possible implementation, in a second possible implementation, before the IV curve scanning, the method further includes: obtaining a maximum value in input voltages of all the IV curve scanning DC-DC circuits when input currents of all the IV curve scanning DC-DC circuits are 0, where the maximum value in the input voltages of all the IV curve scanning DC-DC circuits is the maximum value in the open-circuit voltages of the photovoltaic strings connected to all the IV curve scanning DC-DC circuits.

With reference to any one of the first aspect or the foregoing possible implementations, in a third possible implementation, the controlling an output power of the inverter circuit to be a specified power reference value includes: obtaining the output power of the inverter circuit; comparing the output power of the inverter circuit with the specified power reference value to obtain a power comparison result; obtaining a first current reference value of a d axis of the inverter circuit via a first proportional-integral regulator based on the power comparison result; and controlling a current of the d-axis of the inverter circuit based on the first current reference value of the d-axis of the inverter circuit.

With reference to any one of the first aspect or the foregoing possible implementations, in a fourth possible implementation, the controlling an output voltage of each non-IV curve scanning DC-DC circuit to be a specified voltage reference value includes: detecting an output voltage of a DC-DC circuit m, where a DC-DC circuit 1 to a DC-DC circuit K are IV curve scanning DC-DC circuits, and a DC-DC circuit (K+1) to a DC-DC circuit N are non-IV curve scanning DC-DC circuits, and m=K+1, K+2, . . . , N; comparing the output voltage of the DC-DC circuit m with the specified voltage reference value to obtain a voltage comparison result; obtaining a feedback current regulation value of the DC-DC circuit m via a second proportional-integral regulator based on the voltage comparison result; using a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process; and controlling a current of the DC-DC circuit m based on the current reference value of the DC-DC circuit m, such that the output voltage of the DC-DC circuit m is the specified voltage reference value.

In the foregoing control method, the output power of the inverter circuit is controlled to be the specified power reference value, and the output voltage of each non-IV curve scanning DC-DC circuit is controlled to be the specified voltage reference value. Because output ends of all the DC-DC circuits are connected in parallel to the input end of the inverter circuit, the bus voltage is an output voltage of each DC-DC circuit, and is also an input voltage of the inverter circuit. In this way, controlling the bus voltage to maintain constant may be implemented by controlling the output voltage of each non-IV curve scanning DC-DC circuit to be the specified voltage reference value.

With reference to any one of the first aspect or the foregoing possible implementations, in a fifth possible implementation, the feedforward current regulation value is obtained according to the following formula:

$$I_{m\_fdb}(t_3) = K_m \cdot \{P_{ref1} - \Sigma_{l=1}^{K}[U_l(t_3) \cdot I_l(t_3)]\} / U_{m_{in}}(t_3),$$

where $K_m$ represents a preset feedforward proportion coefficient, $0 \leq K_m \leq 1$, $P_{ref1} = \Sigma_{j=K+1}^{N} P_j(t_0) \cdot \alpha$, $0 < \alpha \leq 1$, $t_0$ represents a moment before the IV curve scanning, $P_j(t_0)$ represents an input power of a DC-DC circuit before the IV curve scanning, $U_l(t_3)$ and $I_l(t_3)$ respectively represent an input voltage and an input current of the DC-DC circuit in the IV curve scanning process, and $U_{m_{in}}(t_3)$ represents an input voltage of the DC-DC circuit m in the IV curve scanning process.

With reference to any one of the first aspect or the foregoing possible implementations, in a sixth possible implementation, the controlling an output power of the inverter circuit to be a specified power reference value includes: obtaining a sum of input powers of all the IV curve scanning DC-DC circuits in the IV curve scanning process; subtracting the sum of the input powers of all the IV curve scanning DC-DC circuits from the specified power reference value to obtain an input power difference; and controlling the sum of the input powers of all the non-IV curve scanning DC-DC circuits to be the input power difference.

With reference to any one of the first aspect or the foregoing possible implementations, in a seventh possible implementation, the controlling the sum of the input powers of all the non-IV curve scanning DC-DC circuits to be the input power difference includes: controlling an input power of a DC-DC circuit m in the non-IV curve scanning DC-DC circuits to be $P_{m\_ref}(t_3)$ according to the following formula, where m=K+1, K+2, . . . , N:

$$P_{m\_ref}(t_3) = K_{m\_pwr} \cdot \{\Sigma_{j=K+1}^{N} P_j(t_0) \cdot \alpha - \Sigma_{l=1}^{K}[U_l(t_3) \cdot I_l(t_3)]\},$$

where $K_{m\_pwr}$ represents a preset input power allocation factor of the DC-DC circuit m, $\Sigma_{m=K+1}^{N} K_{m\_pwr} = 1$, $P_j(t_0)$ represents an input power of a DC-DC circuit before the IV curve scanning, and $U_l(t_3)$ and $I_l(t_3)$ respectively represent an input voltage and an input current of the DC-DC circuit in the IV curve scanning process.

With reference to any one of the first aspect or the foregoing possible implementations, in an eighth possible implementation, the controlling an input power of a DC-DC circuit m to be $P_{m\_ref}(t_3)$ includes: obtaining an input voltage of the DC-DC circuit m in the IV curve scanning process; obtaining a current reference value of the DC-DC circuit m based on the input voltage of the DC-DC circuit m and the input power $P_{m\_ref}(t_3)$ of the DC-DC circuit m; and controlling a current of the DC-DC circuit m based on the current reference value of the DC-DC circuit m, such that the input power of the DC-DC circuit m is $P_{m\_ref}(t_3)$.

With reference to any one of the first aspect or the foregoing possible implementations, in a ninth possible implementation, the controlling an output voltage of each non-IV curve scanning DC-DC circuit to be a specified voltage reference value includes: obtaining an input voltage of the inverter circuit, where the input voltage of the inverter circuit is equal to the output voltage of each non-IV curve scanning DC-DC circuit; comparing the input voltage of the inverter circuit with the specified voltage reference value to obtain a comparison result for the input voltage of the inverter circuit; obtaining a second current reference value of a d axis of the inverter circuit via a third proportional-integral regulator based on the comparison result for the input voltage of the inverter circuit; and controlling a current of the d axis of the inverter circuit based on the second current reference value of the d axis of the inverter circuit, such that the output voltage of each non-IV curve scanning DC-DC circuit is the specified voltage reference value.

In the foregoing control method, a sum of the sum of the input powers of all the IV curve scanning DC-DC circuits and the sum of the input powers of all the non-IV curve scanning DC-DC circuits is controlled to be the specified power reference value. This control manner is also referred to as a complementary power control mode. In this embodiment, controlling the bus voltage to maintain constant is implemented by controlling the input voltage of the inverter circuit to be the specified voltage reference value. The input voltage of the inverter circuit is equal to the output voltage of each non-IV curve scanning DC-DC circuit connected to the inverter circuit. Controlling the input voltage of the inverter circuit to be the specified voltage reference value is implemented using a voltage in outer loop control and using a current in inner loop control. To be more specific, a comparison result obtained during the voltage-based outer loop control is used as a reference value during the current-based inner loop control, and the current is controlled to reach the reference value, to implement voltage control. A known control method may be used as a method for controlling the current.

With reference to any one of the first aspect or the foregoing possible implementations, in a tenth possible implementation, the IV curve scanning includes: controlling an input voltage of each IV curve scanning DC-DC circuit to gradually change from an open-circuit voltage to a short-circuit voltage; recording the input voltage and a corresponding input current of each IV curve scanning DC-DC circuit in a process in which the input voltage of each IV curve scanning DC-DC circuit changes; and obtaining, based on the recorded input voltage and corresponding input current, an IV curve corresponding to each IV curve scanning DC-DC circuit.

In the control method provided in this embodiment of this application, the non-IV curve scanning DC-DC circuit is controlled to operate in a bus voltage control mode or a complementary input power mode. An appropriate power may be extracted from a photovoltaic string on which IV curve scanning is not performed, to reduce an energy yield loss during the IV curve scanning. The inverter circuit is controlled to operate in a constant output power mode or a bus voltage control mode, to ensure that an output power of the string inverter maintains stable and does not fluctuate during the IV curve scanning. In this way, impact on stability of an alternating current power grid is reduced, and a power grid failure is avoided.

According to a second aspect, a controller for a string inverter is provided, where the controller is applied to the string inverter; and the string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit; and the controller is configured to: in an IV curve scanning process, control an output power of the inverter circuit to be a specified power reference value, and control an output voltage of each non-IV curve scanning DC-DC circuit to be a specified voltage reference value, where the specified power reference value is less than or equal to a sum of input powers of all non-IV curve scanning DC-DC circuits before IV curve scanning, and the specified voltage reference value is greater than or equal to a preset percentage of a maximum value in open-circuit voltages of all IV curve scanning DC-DC circuits before the IV curve scanning.

In a first possible implementation of the second aspect, the controller is further configured to obtain the sum of the input powers of all the non-IV curve scanning DC-DC circuits before the IV curve scanning.

With reference to any one of the second aspect or the foregoing possible implementation, in a second possible implementation, the controller is further configured to obtain, before the IV curve scanning, a maximum value in input voltages of all the IV curve scanning DC-DC circuits when input currents of all the IV curve scanning DC-DC circuits are 0, where the maximum value in the input voltages of all the IV curve scanning DC-DC circuits is a maximum value in open-circuit voltages of photovoltaic strings connected to all the IV curve scanning DC-DC circuits.

With reference to any one of the second aspect or the foregoing possible implementations, in a third possible implementation, that the controller controls an output power of the inverter circuit to be a specified power reference value includes: obtaining the output power of the inverter circuit; comparing the output power of the inverter circuit with the specified power reference value to obtain a power comparison result; obtaining a first current reference value of a d axis of the inverter circuit via a first proportional-integral regulator based on the power comparison result; and controlling a current of the d axis of the inverter circuit based on the first current reference value of the d axis of the inverter circuit.

With reference to any one of the second aspect or the foregoing possible implementations, in a fourth possible implementation, that the controller controls an output voltage of each non-IV curve scanning DC-DC circuit to be a specified voltage reference value includes: detecting an output voltage of a DC-DC circuit m, where in the IV curve scanning process, a DC-DC circuit 1 to a DC-DC circuit K are IV curve scanning DC-DC circuits, a DC-DC circuit (K+1) to a DC-DC circuit N are non-IV curve scanning DC-DC circuits, and m=K+1, K+2, . . . , N; comparing the output voltage of the DC-DC circuit m with the specified voltage reference value to obtain a voltage comparison result; obtaining a feedback current regulation value of the DC-DC circuit m via a second proportional-integral regulator based on the voltage comparison result; using a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process; and controlling a current of the DC-DC circuit m based on the current reference value of the DC-DC circuit m, such that the output voltage of the DC-DC circuit m is the specified voltage reference value.

With reference to any one of the second aspect or the foregoing possible implementations, in a fifth possible implementation, that the controller controls an output power of the inverter circuit to be a specified power reference value includes: obtaining a sum of input powers of all the IV curve scanning DC-DC circuits; subtracting the sum of the input powers of all the IV curve scanning DC-DC circuits from the specified power reference value to obtain an input power difference; and controlling the sum of the input powers of all the non-IV curve scanning DC-DC circuits to be the input power difference.

With reference to any one of the second aspect or the foregoing possible implementations, in a sixth possible implementation, that the controller controls the sum of the input powers of all the non-IV curve scanning DC-DC circuits to be the input power difference includes: controlling an input power of a DC-DC circuit m in the non-IV curve scanning DC-DC circuits to be $P_{m\_ref}(t_3)$ according to the following formula, where m=K+1, K+2, . . . , N:

$$P_{m\_ref}(t_3)=K_{m\_pwr}\cdot\{\Sigma_{j=K+1}^{N}P_j(t_0)\cdot\alpha-\Sigma_{l=1}^{K}[U_l(t_3)\cdot I_l(t_3)]\},$$

where $K_{m\_pwr}$ represents a preset input power allocation factor of the DC-DC circuit m, $\Sigma_{m=K+1}^{N} K_{m\_pwr}=1$, $P_j(t_0)$ represents an input power of a DC-DC circuit before the IV curve scanning, and $U_j(t_3)$ and $I_j(t_3)$ respectively represent an input voltage and an input current of the DC-DC circuit in the IV curve scanning process.

With reference to any one of the second aspect or the foregoing possible implementations, in a seventh possible implementation, that the controller controls an input power of a DC-DC circuit m to be $P_{m\_ref}(t_3)$ includes: obtaining an input voltage of the DC-DC circuit m; obtaining a current reference value of the DC-DC circuit m based on the input voltage of the DC-DC circuit m and the input power $P_{m\_ref}(t_3)$ of the DC-DC circuit m; and controlling a current of the DC-DC circuit m based on the current reference value of the DC-DC circuit m, such that the input power of the DC-DC circuit m is $P_{m\_ref}(t_3)$.

With reference to any one of the second aspect or the foregoing possible implementations, in an eighth possible implementation, that the controller controls an output voltage of each non-IV curve scanning DC-DC circuit to be a specified voltage reference value includes: obtaining an input voltage of the inverter circuit, where the input voltage of the inverter circuit is equal to the output voltage of each non-IV curve scanning DC-DC circuit; comparing the input voltage of the inverter circuit with the specified voltage reference value to obtain a comparison result for the input voltage of the inverter circuit; obtaining a second current reference value of a d axis of the inverter circuit via a third proportional-integral regulator based on the comparison result for the input voltage of the inverter circuit; and controlling a current of the d axis of the inverter circuit based on the second current reference value of the d axis of the inverter circuit, such that the output voltage of each non-IV curve scanning DC-DC circuit is the specified voltage reference value $U_{bus\_ref}$:

$$U_{bus\_ref} \geq U_{max}(t_1)\cdot\beta$$

β may be set based on an actual requirement. However, to achieve a better IV curve scanning effect, a value range of β is usually greater than or equal to 80% and less than or equal to 100%. For example, β is set to 90%, in other words, $U_{bus\_ref}$ is greater than or equal to 90% of the maximum value in the open-circuit voltages. It is better to set the preset percentage to 100%, in other words, $U_{bus\_ref}$ is greater than or equal to $U_{max}(t_1)$, to achieve the better IV curve scanning effect. In this way, IV curve scanning can be performed, from an open-circuit voltage to a short-circuit voltage of the photovoltaic string, on the photovoltaic string connected to each IV curve scanning DC-DC circuit, and whether the photovoltaic string is faulty can be fully determined.

When $U_{bus\_ref}$ is equal to $U_{max(t1)}$, the IV curve scanning can be performed on the photovoltaic string connected to each IV curve scanning DC-DC circuit. Certainly, $U_{bus\_ref}$ may alternatively be a voltage value greater than $U_{max(t1)}$.

According to a third aspect, a string inverter is provided, including an inverter circuit and N DC-DC converter circuits, where N is an integer greater than or equal to 2, an input end of each DC-DC circuit is connected to a corresponding photovoltaic string, and an output end of each DC-DC circuit is connected to an input end of the inverter circuit; and further including the foregoing controller.

According to a fourth aspect, a photovoltaic inverter system is provided, including a photovoltaic string and the string inverter, where the string inverter is configured to convert a direct current output by a DC-DC circuit into an alternating current.

In a first possible implementation of the fourth aspect, the photovoltaic inverter system further includes an upper management device; and the controller is configured to: respond to an instruction that is used for performing IV curve scanning and that is sent by the upper management device; and send an obtained IV curve to the upper management device.

According to a fifth aspect, a control apparatus for a string inverter is provided, where the apparatus is applied to the string inverter; and the string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit; and the control apparatus includes a control unit, where the control unit is configured to: in an IV curve scanning process, control an output power of the inverter circuit to be a specified power reference value, and control an output voltage of each non-IV curve scanning DC-DC circuit to be a specified voltage reference value, where the specified power reference value is less than or equal to a sum of input powers of all non-IV curve scanning DC-DC circuits before IV curve scanning, and the specified voltage reference value is greater than or equal to a preset percentage of a maximum value in open-circuit voltages of all IV curve scanning DC-DC circuits before the IV curve scanning.

In a first possible implementation of the fifth aspect, the control unit includes: an inverter circuit output power obtaining subunit configured to obtain the output power of the inverter circuit; a first comparison subunit configured to compare the output power of the inverter circuit with the specified power reference value to obtain a power comparison result; a first proportional-integral regulation subunit configured to obtain a first current reference value of a d axis of the inverter circuit via a first proportional-integral regulator based on the power comparison result; and a first control subunit configured to control a current of the d axis of the inverter circuit based on the first current reference value of the d axis of the inverter circuit.

With reference to any one of the fifth aspect or the foregoing possible implementation, in a first possible implementation, the control unit includes: a DC-DC circuit output voltage detection subunit configured to detect an output voltage of a DC-DC circuit m, where in the IV curve scanning process, a DC-DC circuit 1 to a DC-DC circuit K are IV curve scanning DC-DC circuits, a DC-DC circuit (K+1) to a DC-DC circuit N are non-IV curve scanning DC-DC circuits, and m=K+1, K+2, . . . , N; a second comparison subunit configured to compare the output voltage of the DC-DC circuit m with the specified voltage reference value to obtain a voltage comparison result; a second proportional-integral regulation subunit configured to obtain a feedback current regulation value of the DC-DC circuit m via a second proportional-integral regulator based on the voltage comparison result; a first current reference value obtaining subunit configured to use a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process; and a first current control subunit configured to control a current of the DC-DC circuit m based on the current reference value of the DC-DC circuit m, such that the output voltage of the DC-DC circuit m is the specified voltage reference value.

With reference to any one of the fifth aspect or the foregoing possible implementations, in a second possible implementation, the control unit includes: a DC-DC circuit input power obtaining subunit configured to obtain a sum of input powers of all the IV curve scanning DC-DC circuits in the IV curve scanning process; an input power difference obtaining subunit configured to subtract the sum of the input powers of all the IV curve scanning DC-DC circuits from the specified power reference value to obtain an input power difference; and a power control subunit configured to control the sum of the input powers of all the non-IV curve scanning DC-DC circuits to be the input power difference.

With reference to any one of the fifth aspect or the foregoing possible implementations, in a third possible implementation, the control unit includes: an inverter circuit input voltage obtaining subunit configured to obtain an input voltage of the inverter circuit, where the input voltage of the inverter circuit is equal to the output voltage of each non-IV curve scanning DC-DC circuit; a voltage comparison subunit configured to compare the input voltage of the inverter circuit with the specified voltage reference value to obtain a comparison result for the input voltage of the inverter circuit; a second current reference value obtaining subunit configured to obtain a second current reference value of a d axis of the inverter circuit via a third proportional-integral regulator based on the comparison result for the input voltage of the inverter circuit; and a second control subunit configured to control a current of the d axis of the inverter circuit based on the second current reference value of the d axis of the inverter circuit, such that the output voltage of each non-IV curve scanning DC-DC circuit is the specified voltage reference value.

With reference to any one of the fifth aspect or the foregoing possible implementations, in a fourth possible implementation, the control unit is further configured to: control an input voltage of each IV curve scanning DC-DC circuit to gradually change from an open-circuit voltage to a short-circuit voltage; record the input voltage and a corresponding input current of each IV curve scanning DC-DC circuit in a process in which the input voltage of each IV curve scanning DC-DC circuit changes; and obtain, based on the recorded input voltage and corresponding input current, an IV curve corresponding to each IV curve scanning DC-DC circuit.

According to a sixth aspect, a computer-readable storage medium is provided. The computer-readable storage medium is configured to store program code, and the program code is used to perform the control method for a string inverter.

Compared with other approaches, the present disclosure has at least the following advantages.

In the IV curve scanning process, the inverter circuit is controlled to maintain the constant output power and the constant bus voltage, where the constant output power is correlated to the sum of the input powers of all the non-IV curve scanning DC-DC circuits before the IV curve scanning, and the constant bus voltage is correlated to the maximum value in the open-circuit voltages of all the IV curve scanning DC-DC circuits. The bus voltage is an input voltage of the inverter circuit, and is also an output voltage of a DC-DC circuit.

In the IV curve scanning process, the inverter circuit is controlled to maintain the constant output power and the constant bus voltage. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. In the method provided in the embodiments of this application, each non-IV curve scanning DC-DC circuit continues to output a power. In this way, electric energy output by each non-IV curve scanning DC-DC circuit can be effectively utilized, and a huge energy yield loss can be avoided.

BRIEF DESCRIPTION OF DRAWINGS

To describe the technical solutions in the embodiments of this application or in other approaches more clearly, the following briefly describes the accompanying drawings for describing the embodiments or other approaches. It is clear that the accompanying drawings described below show some embodiments of this application, and a person of ordinary skill in the art may still derive other drawings from these accompanying drawings without creative efforts.

DESCRIPTION OF EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. It is clear that the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
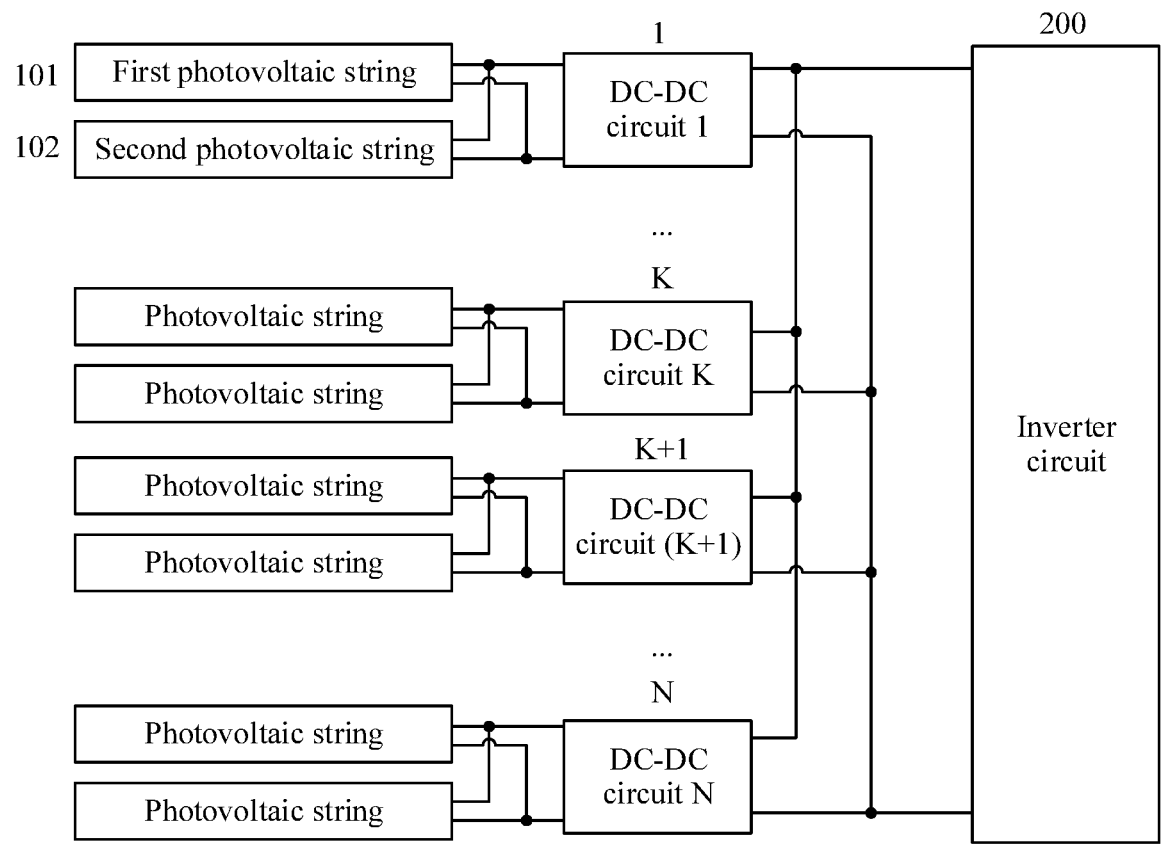
FIG. 1 is a schematic diagram of a string inverter according to an embodiment of this application.

Technical scenarios to which the technical solutions provided in the embodiments of this application are applied are first described with reference to the accompanying drawings. FIG. 1 is a schematic diagram of a string inverter according to an embodiment of this application.

The string inverter includes an inverter circuit 200 and N direct current to direct current (DC-DC) converter circuits, where N is an integer greater than or equal to 2. In the figure, the N DC-DC circuits are respectively a DC-DC circuit 1 to a DC-DC circuit N. It should be noted that the DC-DC circuit 1 to the DC-DC circuit N are merely used to distinguish between the DC-DC circuits, but do not represent a sequence.

An input end of each DC-DC circuit is connected to a corresponding photovoltaic string. In FIG. 1, that the input end of each DC-DC circuit is connected to two photovoltaic strings is used as an example for description. For example, an input end of the DC-DC circuit 1 is connected to a first photovoltaic string 101 and a second photovoltaic string 102. To be more specific, an output end of the first photovoltaic string 101 and an output end of the second photovoltaic string 102 are connected in parallel to the input end of the DC-DC circuit 1.

An output end of each DC-DC circuit is connected to an input end of the inverter circuit 200. As shown in FIG. 1, output ends of the DC-DC circuit 1 to the DC-DC circuit N are all connected to the input end of the inverter circuit 200. To be more specific, the output ends of the DC-DC circuit 1 to the DC-DC circuit N are connected together in parallel. An input power of the inverter circuit 200 is equal to a sum of output powers of the DC-DC circuit 1 to the DC-DC circuit N.

In the embodiments of this application, a quantity of photovoltaic strings connected to each DC-DC circuit is not specifically limited, and may be set based on an output voltage of a photovoltaic string and a voltage level required by a power plant.

Figure 2:
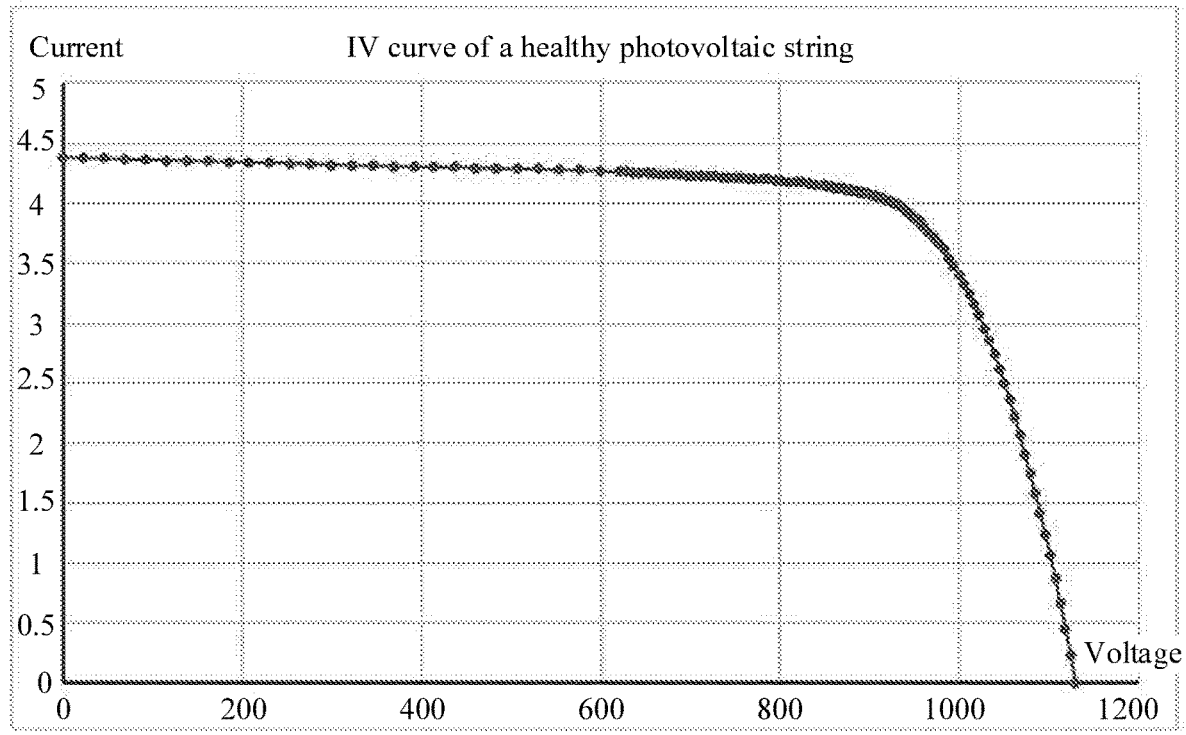
FIG. 2 is a schematic diagram of an IV curve of a photovoltaic string according to an embodiment of this application.

In an ideal condition, an IV curve of a photovoltaic string is shown in FIG. 2: A horizontal axis represents a voltage (unit: volt), and a vertical axis represents a current (unit: ampere). It can be learned from FIG. 2 that an output current of a photovoltaic string decreases with an increase of an output current.

In a process of performing IV curve scanning on a photovoltaic string, a DC-DC circuit connected to the photovoltaic string controls an output voltage of the photovoltaic string to be scanned from an open-circuit voltage to a short-circuit voltage. Because the output voltage of the photovoltaic string is an input voltage of the connected DC-DC circuit, the input voltage of the DC-DC circuit is controlled to be scanned from the open-circuit voltage to the short-circuit voltage. A non-IV curve scanning DC-DC circuit does not output a power. In other words, an output current of the non-IV curve scanning DC-DC circuit is controlled to be 0.

As shown in FIG. 1, for example, IV curve scanning is performed on photovoltaic strings corresponding to the DC-DC circuit 1 to the DC-DC circuit K, and IV curve scanning is not performed on photovoltaic strings corresponding to the DC-DC circuit (K+1) to the DC-DC circuit N.

In the IV curve scanning process, an input voltage of each IV curve scanning DC-DC circuit is changing. Therefore, an output power of each IV curve scanning DC-DC circuit fluctuates, and an output power of each non-IV curve scanning DC-DC circuit is 0. In this case, an output power of the inverter circuit fluctuates, electric energy generated by a photovoltaic string on which IV curve scanning is not performed is wasted, and an energy yield loss is relatively high. If IV curve scanning is simultaneously performed on thousands of string inverters in the power plant, an energy yield loss is huge, and a power grid is unstable. If IV curve scanning is performed on string inverters in batches in an entire photovoltaic inverter system, output power fluctuation of the photovoltaic inverter system is reduced, but an entire IV curve scanning process of the PV inverter system is prolonged, and operation and maintenance efficiency is reduced.

Therefore, the embodiments of this application provide a control method for a string inverter, to control, in an IV curve scanning process, an inverter circuit to maintain a constant output power and a constant bus voltage, where the constant output power is correlated to a sum of input powers of all non-IV curve scanning DC-DC circuits before IV curve scanning, and the constant bus voltage is correlated to a maximum value in open-circuit voltages of all IV curve scanning DC-DC circuits.

The bus voltage is an input voltage of the inverter circuit, and is also an output voltage of a DC-DC circuit.

In the method provided in the embodiments of this application, in the IV curve scanning process, the inverter circuit is controlled to maintain the constant output power and the constant bus voltage. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. In the method provided in the embodiments of this application, each non-IV curve scanning DC-DC circuit continues to output a power. In this way, electric energy output by each non-IV curve scanning DC-DC circuit can be effectively utilized, and a huge energy yield loss can be avoided.

Scenarios in which the embodiments of this application are applied include a large-scale photovoltaic power plant application scenario, a small- and medium-scale distributed power plant application scenario, a home photovoltaic power generation system, and the like. An output end of the string inverter is connected to a transformer via a cable, or directly connected to a single-phase alternating current power grid, or directly connected to a three-phase alternating current power grid.

Method Embodiment 1

Figure 3:
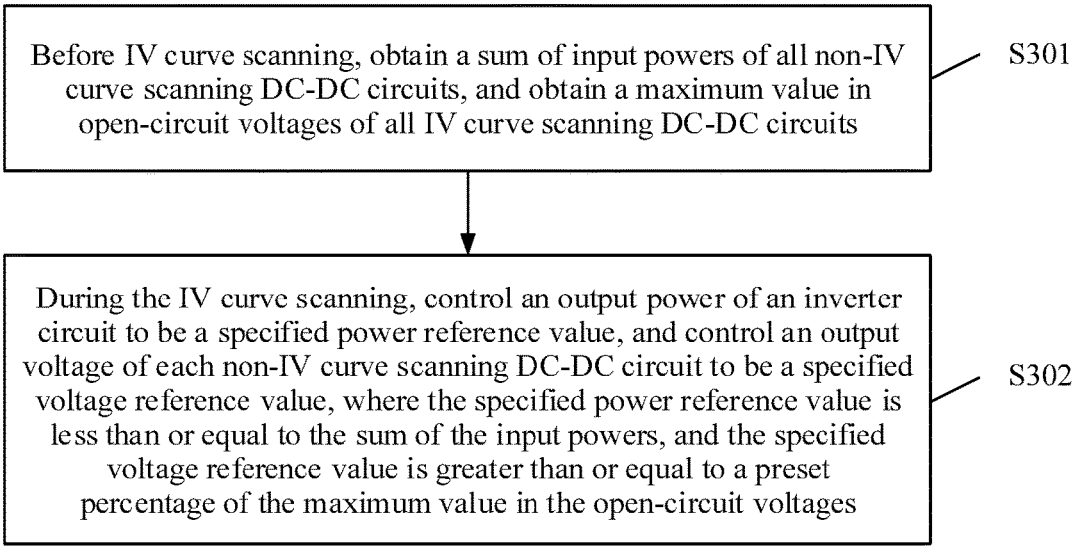
FIG. 3 is a flowchart of a control method according to an embodiment of this application.

FIG. 3 is a flowchart of a control method according to an embodiment of this application.

The control method for a string inverter provided in this embodiment is applied to the string inverter. The string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit.

The method includes the following steps.

S301: Before IV curve scanning, obtain a sum of input powers of all non-IV curve scanning DC-DC circuits, and obtain a maximum value in open-circuit voltages of all IV curve scanning DC-DC circuits.

An open-circuit voltage obtaining process includes: obtaining a maximum value in input voltages of all the IV curve scanning DC-DC circuits when input currents of all the IV curve scanning DC-DC circuits are 0, where the maximum value in the input voltages of all the IV curve scanning DC-DC circuits is a maximum value in open-circuit voltages of photovoltaic strings connected to all the IV curve scanning DC-DC circuits. Because an output voltage of a photovoltaic string is an input voltage of a DC-DC circuit connected to the photovoltaic string, an open-circuit voltage of the photovoltaic string is essentially the input voltage of the corresponding DC-DC circuit when an input current of the DC-DC circuit is 0.

The following provides descriptions using an example in which a DC-DC circuit 1 to a DC-DC circuit K in the N DC-DC circuits are IV curve scanning DC-DC circuits, and a DC-DC circuit (K+1) to a DC-DC circuit N in the N DC-DC circuits are non-IV curve scanning DC-DC circuits.

In an actual IV curve scanning process, before IV curve scanning, a controller of the string inverter receives an instruction that is used for performing IV curve scanning on photovoltaic strings connected to the DC-DC circuit 1 to the DC-DC circuit K and that is sent by an upper management device. Certainly, the controller of the string inverter may directly determine to perform the IV curve scanning.

At a moment $t_0$, input powers of the DC-DC circuit 1 to the DC-DC circuit N are recorded as $P_j(t_0)$, where j=1, 2, 3, ..., N; and input voltages of the DC-DC circuit 1 to the DC-DC circuit N are recorded as $U_j(t_0)$, where j=1, 2, 3, ..., N. The sum of the input powers of all the non-IV curve scanning DC-DC circuits is input powers of the DC-DC circuit (K+1) to the DC-DC circuit N, that is, $P_j(t_0)$.

Then, input currents of the DC-DC circuit 1 to the DC-DC circuit K are controlled to be 0, and the input powers of the DC-DC circuit (K+1) to the DC-DC circuit N is controlled to remain unchanged for a period of time $\Delta t$. At a moment $t_1 = t_0 + \Delta t$, input powers of the DC-DC circuit 1 to the DC-DC circuit K are recorded as $P_l(t_1)$, where l=1, 2, 3, ..., K; and input voltages of the DC-DC circuit 1 to the DC-DC circuit K are recorded as $U_l(t_1)$, where l=1, 2, 3, ..., K. A maximum value in $U_l(t_1)$ is $U_{max}(t_1)$, where l=1, 2, 3, ..., K. In other words, $U_{max}(t_1)$ is the maximum value in the open-circuit voltages of the photovoltaic strings connected to all the IV curve scanning DC-DC circuits.

The moment $t_0$ and the moment $t_1$ are both before the IV curve scanning.

S302: In an IV curve scanning process, control an output power of the inverter circuit to be a specified power reference value $P_{ref1}$, and control an output voltage of each non-IV curve scanning DC-DC circuit to be a specified voltage reference value $U_{bus\_ref}$, where the specified power reference value $P_{ref1}$ is less than or equal to the sum of the input powers, and the specified voltage reference value is greater than or equal to a preset percentage of the maximum value in the open-circuit voltages:

$$P_{ref1} = \Sigma_{j=K+1}^{N} P_j(t_0) \cdot \alpha,$$

where $0 < \alpha \leq 1$, and $P_{ref1}$ is less than or equal to the sum of the input powers; and $U_{bus\_ref} \geq U_{max}(t_1) \cdot \beta$.

β may be set based on an actual requirement. However, to achieve a better IV curve scanning effect, a value range of β is usually greater than or equal to 80% and less than or equal to 100%. For example, β is set to 90%, in other words, $U_{bus\_ref}$ is greater than or equal to 90% of the maximum value in the open-circuit voltages. It is better to set the preset percentage to 100%, in other words, $U_{bus\_ref}$ is greater than or equal to $U_{max}(t_1)$, to achieve the better IV curve scanning effect. In this way, IV curve scanning can be performed, from an open-circuit voltage to a short-circuit voltage of the photovoltaic string, on the photovoltaic string connected to each IV curve scanning DC-DC circuit, and whether the photovoltaic string is faulty can be fully determined.

When $U_{bus\_ref}$ is equal to $U_{max(t1)}$, the IV curve scanning can be performed on the photovoltaic string connected to each IV curve scanning DC-DC circuit. Certainly, $U_{bus\_ref}$ may alternatively be a voltage value greater than $U_{max(t1)}$.

A DC-DC circuit is usually a boost circuit, in other words, an output voltage of the DC-DC circuit is greater than or equal to an input voltage of the DC-DC circuit. The input voltage of the DC-DC circuit is an output voltage of a corresponding photovoltaic string. In a process of performing IV curve scanning on the photovoltaic string, the output voltage of the photovoltaic string is to be scanned from an open-circuit voltage to a short-circuit voltage. In other words, a maximum output voltage of the photovoltaic string is the open-circuit voltage. In this case, a maximum input voltage of the DC-DC circuit is the open-circuit voltage of the corresponding photovoltaic string. Therefore, the output voltage of the DC-DC circuit is greater than or equal to the open-circuit voltage of the corresponding photovoltaic string. In addition, the output ends of all the DC-DC circuits are connected together in parallel. In the IV curve scanning process, the output voltage of the DC-DC circuit needs to meet a condition that open-circuit voltages of all photovoltaic strings on which the IV curve scanning is performed can be scanned during the IV curve scanning. Therefore, $U_{bus\_ref}$ needs to be greater than or equal to the maximum value in the open circuit voltages. If $U_{bus\_ref}$ is less than the maximum value in the open circuit voltages, it cannot be ensured that the open-circuit voltages of all the photovoltaic strings on which the IV curve scanning is performed can be scanned during the IV curve scanning. Consequently, the IV curve scanning cannot be completed.

The DC-DC circuit is a boost circuit, and may be implemented using a boost circuit.

It may be understood that, before the controlling an output power of the inverter circuit to be a specified power reference value means before the IV curve scanning.

In the method provided in this embodiment of this application, in the IV curve scanning process, the inverter circuit is controlled to maintain a constant output power and a constant bus voltage. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. In the method provided in this embodiment of this application, each non-IV curve scanning DC-DC circuit is controlled to continue to output a power. In this way, electric energy output by each non-IV curve scanning DC-DC circuit can be effectively utilized, and a huge energy yield loss can be avoided.

The following describes, with reference to simulation diagrams, beneficial effects achieved in the control method provided in this embodiment of this application.

Figure 4:
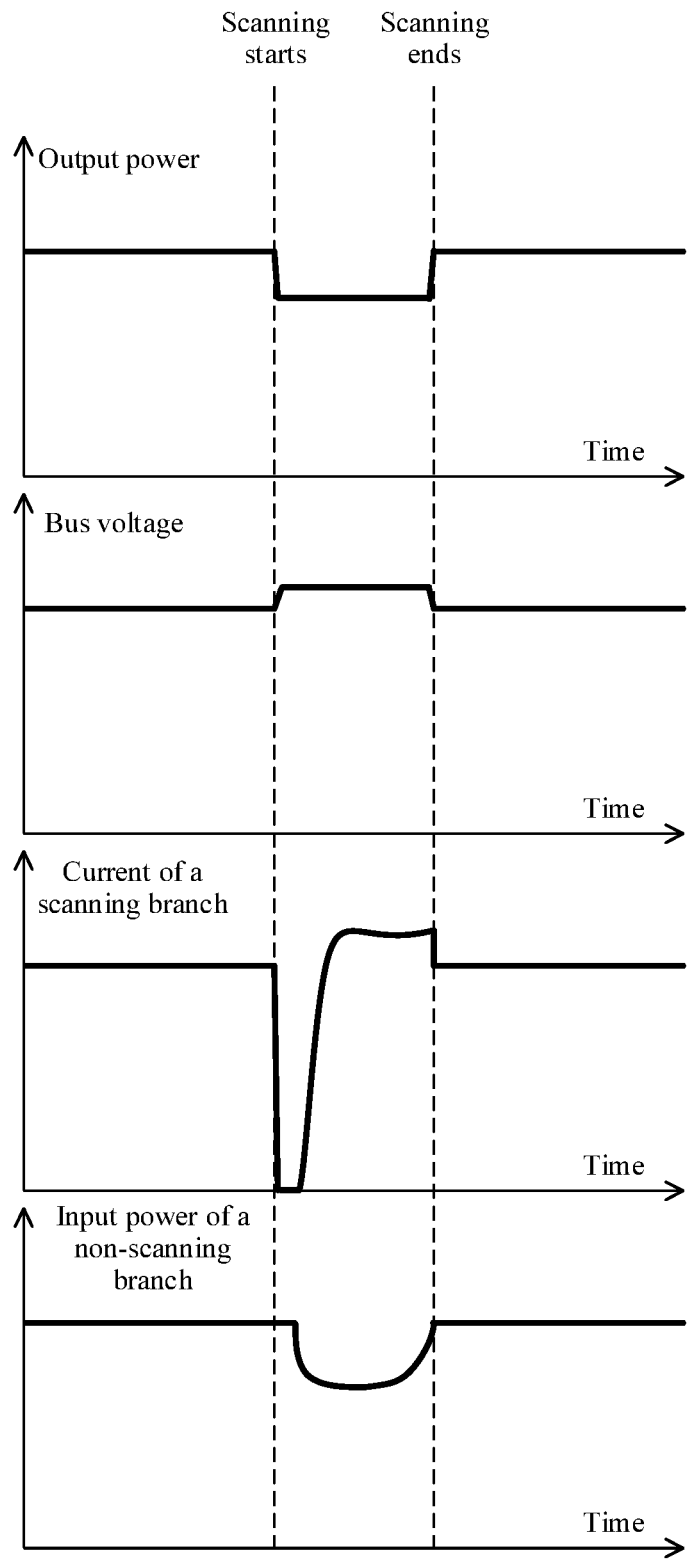
FIG. 4 is a schematic diagram of an effect achieved in a control method according to an embodiment of this application.

FIG. 4 is a schematic diagram of an effect achieved in a control method according to an embodiment of this application.

Figure 5:
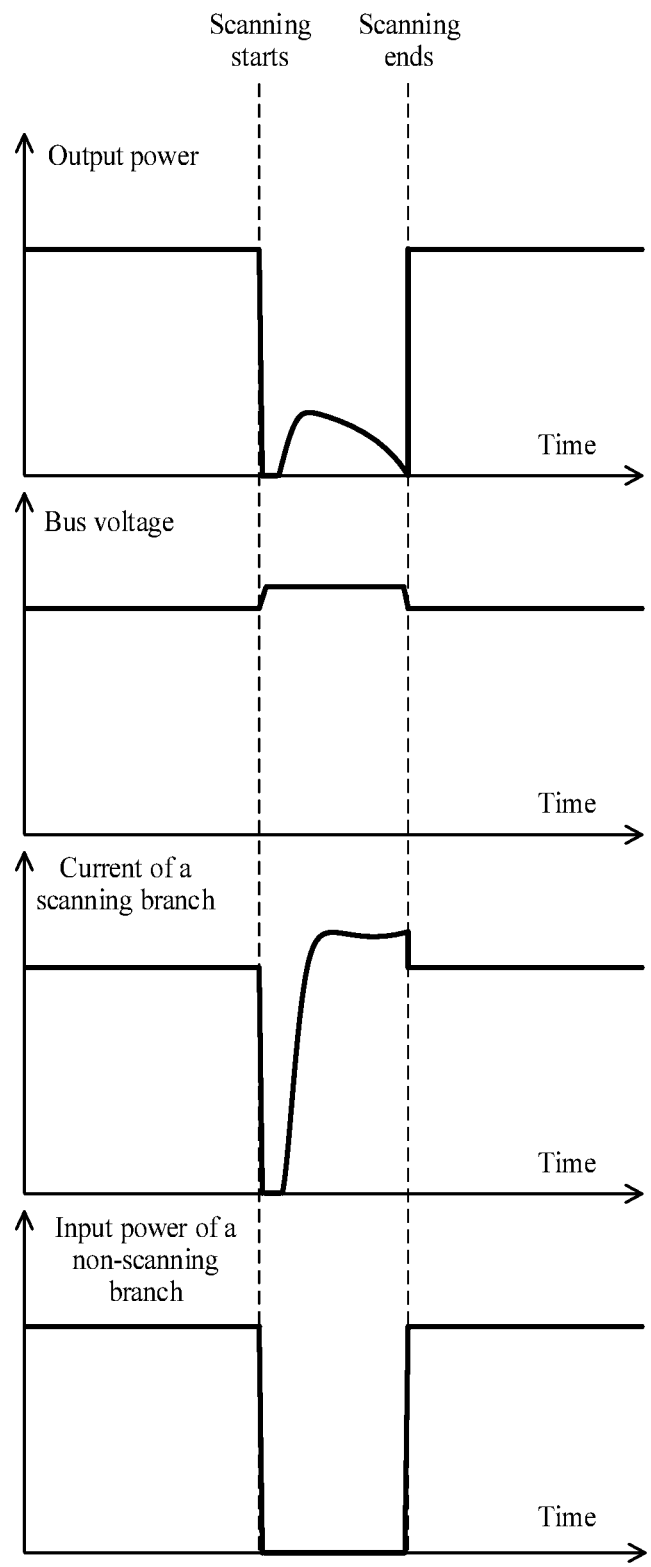
FIG. 5 is a schematic diagram of an effect corresponding to a case in which an output power of a non-IV curve scanning DC-DC circuit is 0 in an IV curve scanning process according to an embodiment of this application.

FIG. 5 is a schematic diagram of an effect corresponding to a case in which an output power of a non-IV curve scanning DC-DC circuit is 0 in an IV curve scanning process.

Output powers in FIG. 4 and FIG. 5 is the output power of the string inverter, namely, the output power of the inverter circuit.

It can be learned by analyzing FIG. 4 that, according to the method provided in this embodiment of this application, the non-IV curve scanning DC-DC circuit (a non-scanning branch) continues to input a power during the IV curve scanning. Therefore, the output power of the inverter circuit is reduced slightly, and the inverter circuit is controlled to output a constant power, to avoid output power fluctuation. For details, refer to a waveform diagram for an output power shown in FIG. 4.

It can be learned by analyzing FIG. 5 that the input power of the non-IV curve scanning DC-DC circuit (the non-scanning branch) is 0 during the IV curve scanning. In this case, the output power of the inverter circuit is equal to only the output power of the IV curve scanning DC-DC circuit. Therefore, an output power of the entire inverter circuit in a scanning period is greatly reduced compared with an output power of the entire inverter circuit in a non-scanning period. In addition, during the IV curve scanning, the output power of the inverter circuit fluctuates.

It can be learned by analyzing FIG. 4 that an output power corresponding to a scanning period is slightly lower than an output power corresponding to a non-scanning period. It can be learned, by comparing the output power in the scanning period in FIG. 4 with the output power in the scanning period in FIG. 5, that the output power in FIG. 4 is greatly improved compared with the output power in FIG. 5. In the control method provided in this embodiment of this application, the output power is relatively high during the IV curve scanning. In this way, a huge energy yield loss is avoided, and no power fluctuation occurs because the output power is constant.

The embodiments of this application provide two methods for controlling an inverter circuit to maintain a constant output power and a constant bus voltage. The following separately describes the methods in detail with reference to Embodiment 2 and Embodiment 3.

Method Embodiment 2

In the control method provided in this embodiment, an output power of an inverter circuit is controlled to be a specified power reference value, and an output voltage of each non-IV curve scanning DC-DC circuit is controlled to be a specified voltage reference value. Because output ends of all DC-DC circuits are connected in parallel to an input end of the inverter circuit, a bus voltage is an output voltage of each DC-DC circuit, and is also an input voltage of the inverter circuit. In this way, controlling the bus voltage to maintain constant may be implemented by controlling the output voltage of each non-IV curve scanning DC-DC circuit to be the specified voltage reference value.

The following first describes the controlling an output power of an inverter circuit to be a specified power reference value.

Figure 6:
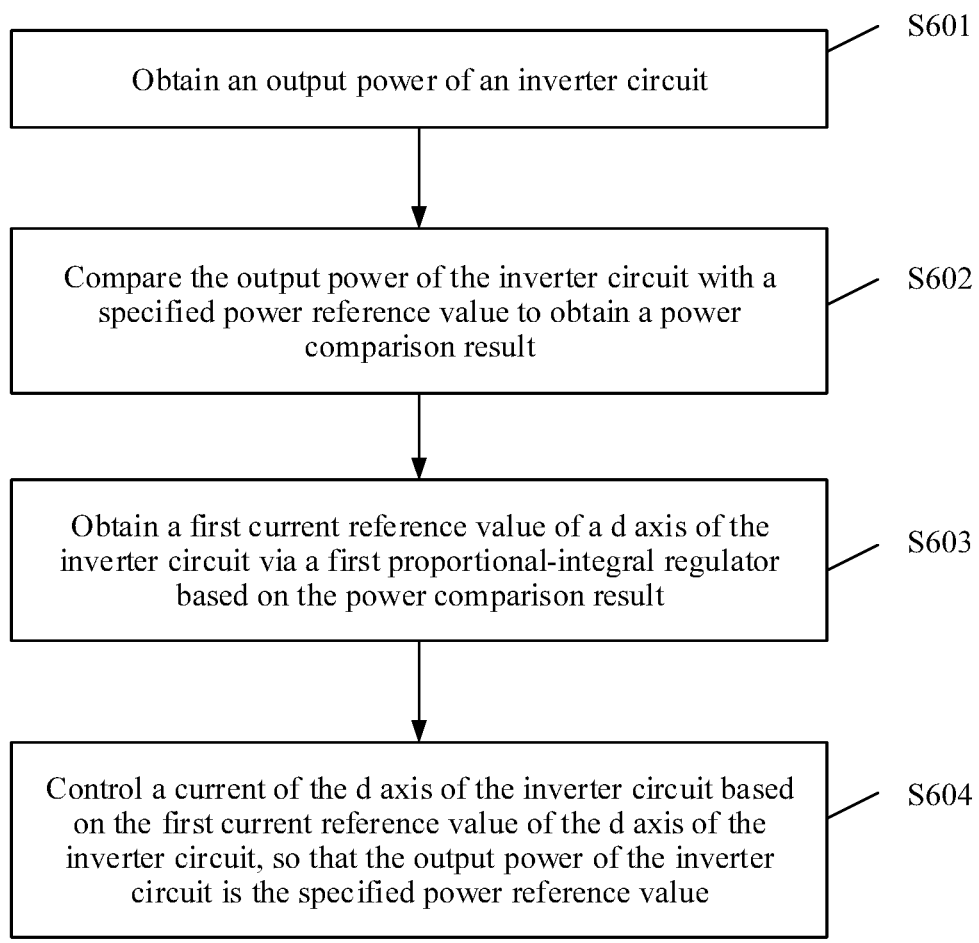
FIG. 6 is a flowchart of a method for controlling an output power of an inverter circuit according to an embodiment of this application.

FIG. 6 is a flowchart of a method for controlling an output power of an inverter circuit according to an embodiment of this application.

The controlling an output power of the inverter circuit to be a specified power reference value includes the following steps.

S601: Obtain the output power of the inverter circuit.

S602: Compare the output power of the inverter circuit with the specified power reference value $P_{ref1}$ to obtain a power comparison result.

S603: Obtain a first current reference value of a d axis of the inverter circuit via a first proportional-integral regulator based on the power comparison result.

S604: Control a current of the d axis of the inverter circuit based on the first current reference value of the d axis of the inverter circuit, such that the output power of the inverter circuit is the specified power reference value.

The output power of the inverter circuit may be controlled by controlling the current of the d axis of the inverter circuit, and a known control method may be used as a method for controlling the current of the d axis.

The following describes the controlling an output voltage of each non-IV curve scanning DC-DC circuit to be a specified voltage reference value.

Figure 7:
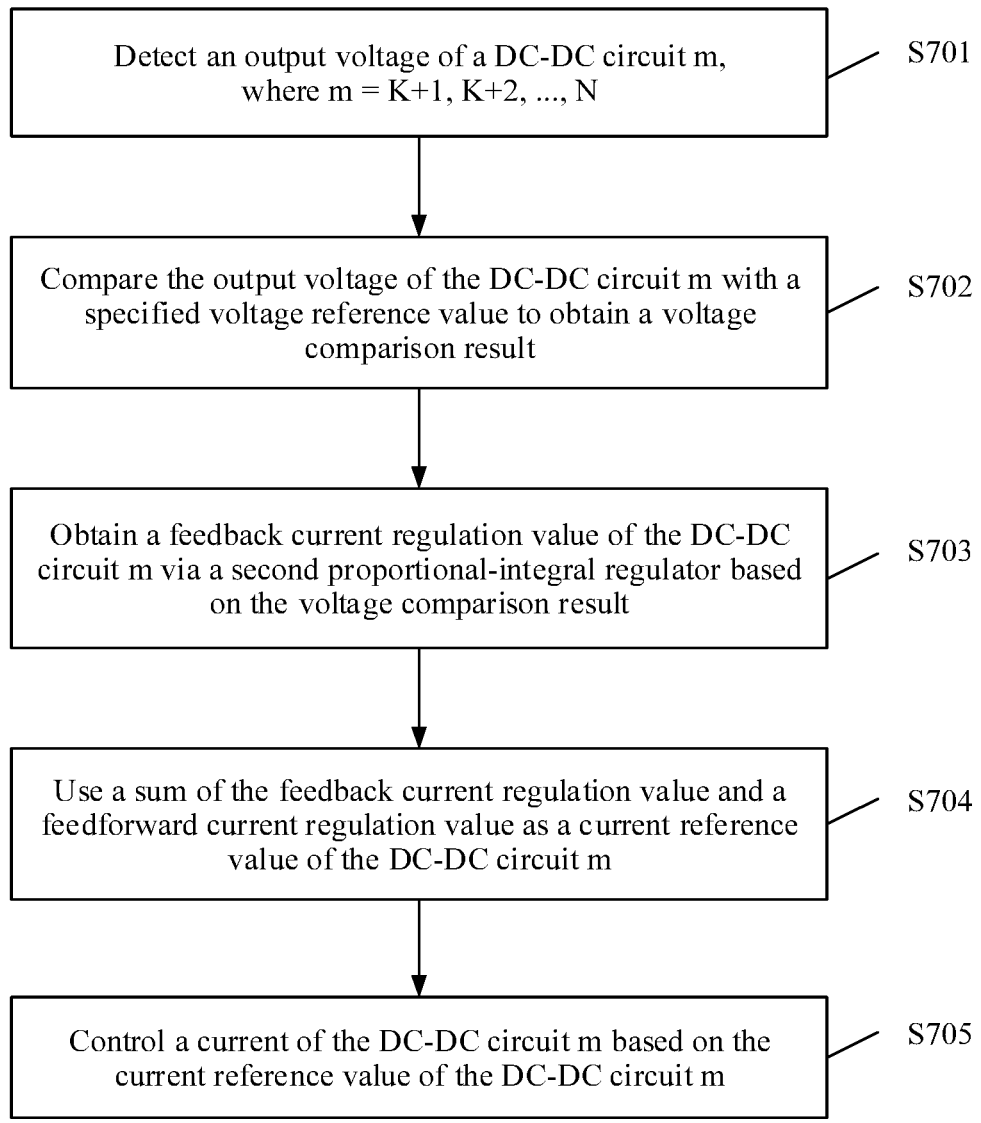
FIG. 7 is a flowchart of a method for controlling an output voltage of a non-IV curve scanning DC-DC circuit according to an embodiment of this application.

FIG. 7 is a flowchart of a method for controlling an output voltage of a non-IV curve scanning DC-DC circuit according to an embodiment of this application.

S701: Detect an output voltage of a DC-DC circuit m, where in the IV curve scanning process, the DC-DC circuit 1 to the DC-DC circuit K are the IV curve scanning DC-DC circuits, the DC-DC circuit (K+1) to the DC-DC circuit N are the non-IV curve scanning DC-DC circuits, and m=K+1, K+2, ..., N.

S702: Compare the output voltage of the DC-DC circuit m with the specified voltage reference value to obtain a voltage comparison result.

S703: Obtain a feedback current regulation value of the DC-DC circuit m via a second proportional-integral regulator based on the voltage comparison result.

S704: Use a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process.

The feedforward current regulation value is obtained according to the following formula:

$$I_{m\_fdb}(t_3) = K_m \cdot \{P_{ref1} - \Sigma_{l=1}^{K}[U_l(t_3) \cdot I_l(t_3)]\} / U_{m_{in}}(t_3),$$

where $K_m$ represents a preset feedforward proportion coefficient, $0 \leq K_m \leq 1$, $P_{ref1} = \Sigma_{j=K+1}^{N} P_j(t_0) \cdot \alpha$, $0 < \alpha \leq 1$, $t_0$ represents a moment before the IV curve scanning, $P_j(t_0)$ represents an input power of a DC-DC circuit before the IV curve scanning, $U_l(t_3)$ and $I_l(t_3)$ respectively represent an input voltage and an input current of the DC-DC circuit in the IV curve scanning process, and $U_{m_{in}}(t_3)$ represents an input voltage of the DC-DC circuit m in the IV curve scanning process.

S705: Control a current of the DC-DC circuit m based on the current reference value of the DC-DC circuit m, such that the output voltage of the DC-DC circuit m is the specified voltage reference value.

S701 to S705 are steps for controlling the output voltage of each non-IV curve scanning DC-DC circuit to be the specified voltage reference value, and are implemented using a voltage in outer loop control and using a current in inner loop control. To be more specific, a comparison result obtained during the voltage-based outer loop control is used as a reference value during the current-based inner loop control, and the current is controlled to reach the reference value, to implement voltage control. A known control method may be used as a method for controlling the current.

In this embodiment, controlling the bus voltage to maintain constant is implemented by controlling the output voltage of each non-IV curve scanning DC-DC circuit to be the specified voltage reference value.

In this embodiment, the power control flowchart 6 and the voltage control flowchart 7 need to be simultaneously performed, because the effects can be achieved only when power control and voltage control are simultaneously performed.

In the foregoing embodiments, a control effect is the best when α is equal to 1.

Method Embodiment 3

In this embodiment, controlling an inverter circuit to maintain a constant output power is implemented by controlling a sum of a sum of input powers of all IV curve scanning DC-DC circuits and a sum of input powers of all non-IV curve scanning DC-DC circuits to be a specified power reference value. This control manner is also referred to as a complementary power control mode. In this embodiment, controlling a bus voltage to maintain constant is implemented by controlling an input voltage of the inverter circuit to be a specified voltage reference value. The input voltage of the inverter circuit is equal to an output voltage of each non-IV curve scanning DC-DC circuit connected to the inverter circuit.

The following first describes a method for controlling an output power of the inverter circuit.

Figure 8:
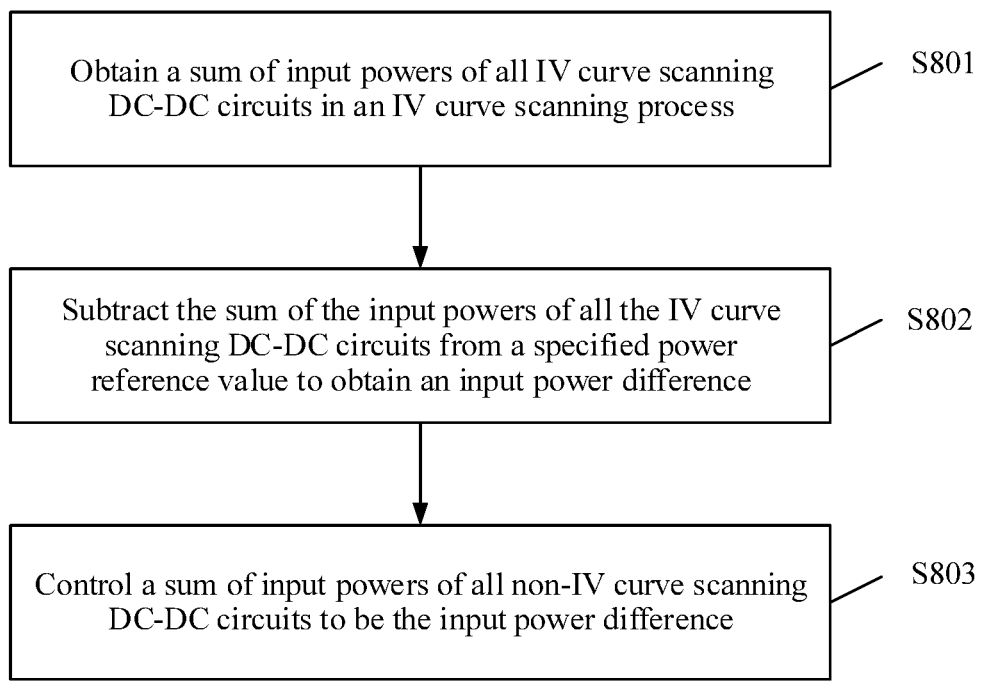
FIG. 8 is a flowchart of another method for controlling an output power of an inverter circuit according to an embodiment of this application.

FIG. 8 is a flowchart of another method for controlling an output power of an inverter circuit according to an embodiment of this application.

The controlling an output power of the inverter circuit to be a specified power reference value includes the following steps.

S801: Obtain the sum of the input powers of all the IV curve scanning DC-DC circuits in an IV curve scanning process.

S802: Subtract the sum of the input powers of all the IV curve scanning DC-DC circuits from the specified power reference value to obtain an input power difference.

S803: Control the sum of the input powers of all the non-IV curve scanning DC-DC circuits to be the input power difference.

The controlling the sum of the input powers of all the non-IV curve scanning DC-DC circuits to be the input power difference includes: controlling an input power of a DC-DC circuit m in the non-IV curve scanning DC-DC circuits to be $P_{m\_ref}(t_3)$ according to the following formula, where m=K+1, K+2, . . . , N:

$$P_{m\_ref}(t_3) = K_{m\_pwr} \cdot \{\Sigma_{j=K+1}^{N} P_j(t_0) \cdot \alpha - \Sigma_{l=1}^{K} [U_l(t_3) \cdot I_l(t_3)]\},$$

where $K_{m\_pwr}$ represents a preset input power allocation factor of the DC-DC circuit m, $\Sigma_{m=K+1}^{N} K_{m\_pwr}=1$, $P_j(t_0)$ represents an input power of a DC-DC circuit before the IV curve scanning, and $U_l(t_3)$ and $I_l(t_3)$ respectively represent an input voltage and an input current of the DC-DC circuit in the IV curve scanning process.

The controlling an input power of a DC-DC circuit m to be $P_{m\_ref}(t_3)$ includes: obtaining an input voltage of the DC-DC circuit m in the IV curve scanning process; obtaining a current reference value of the DC-DC circuit m based on the input voltage of the DC-DC circuit m and the input power $P_{m\_ref}(t_3)$ of the DC-DC circuit m; and controlling a current of the DC-DC circuit m based on the current reference value of the DC-DC circuit m, such that the input power of the DC-DC circuit m is $P_{m\_ref}(t_3)$.

In the control method provided in this embodiment, the input powers of all the IV curve scanning DC-DC circuits need to be obtained in real time, and the input powers of all the non-IV curve scanning DC-DC circuits are controlled based on the specified power reference value.

The following describes a method for controlling an output voltage of a non-IV curve scanning DC-DC circuit.

Figure 9:
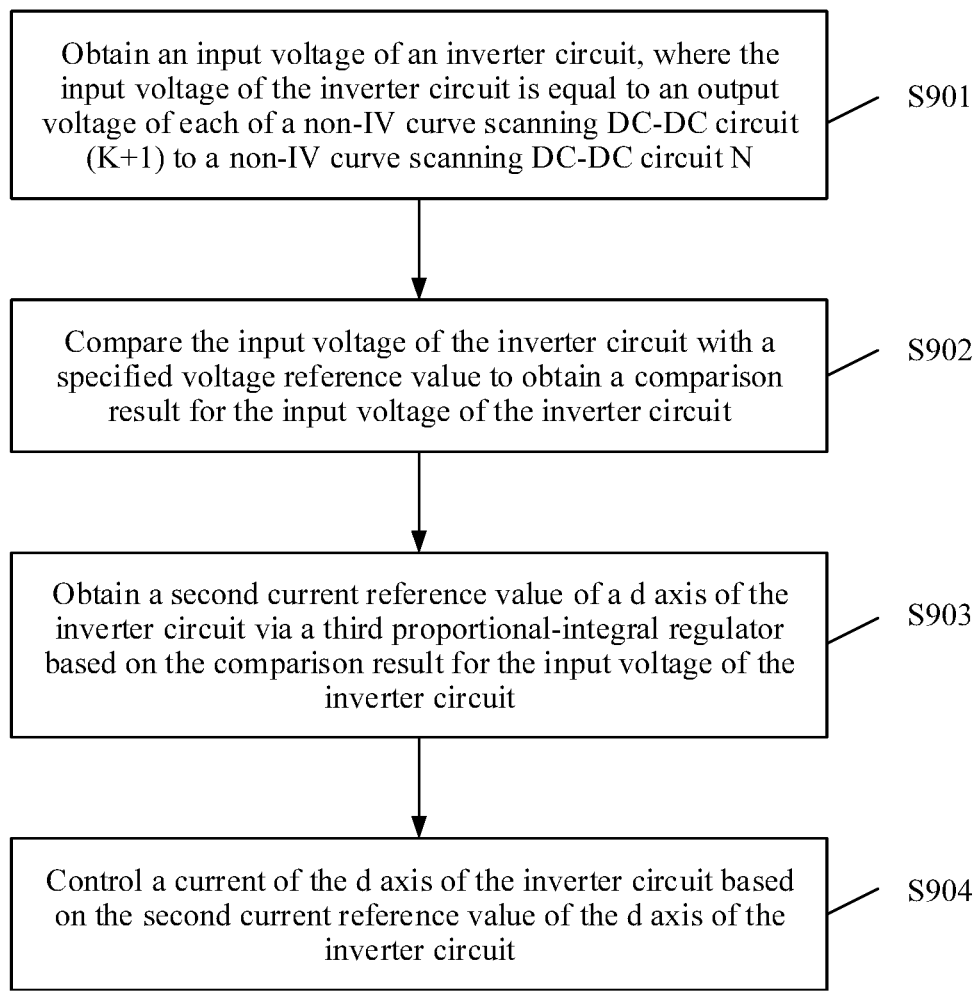
FIG. 9 is a flowchart of another method for controlling an output voltage of a non-IV curve scanning DC-DC circuit according to an embodiment of this application.

FIG. 9 is a flowchart of another method for controlling an output voltage of a non-IV curve scanning DC-DC circuit according to an embodiment of this application.

The controlling an output voltage of each non-IV curve scanning DC-DC circuit to be a specified voltage reference value includes the following steps.

S901: Obtain an input voltage of the inverter circuit, where the input voltage of the inverter circuit is equal to the output voltage of each non-IV curve scanning DC-DC circuit.

S902: Compare the input voltage of the inverter circuit with the specified voltage reference value to obtain a comparison result for the input voltage of the inverter circuit.

S903: Obtain a second current reference value of a d axis of the inverter circuit via a third proportional-integral regulator based on the comparison result for the input voltage of the inverter circuit.

S904: Control a current of the d axis of the inverter circuit based on the second current reference value of the d axis of the inverter circuit, such that the output voltage of each non-IV curve scanning DC-DC circuit is the specified voltage reference value.

S901 to S904 are steps for controlling the input voltage of the inverter circuit to be the specified voltage reference value, and are implemented using a voltage in outer loop control and using a current in inner loop control. To be more specific, a comparison result obtained during the voltage-based outer loop control is used as a reference value during the current-based inner loop control, and the current is controlled to reach the reference value, to implement voltage control. A known control method may be used as a method for controlling the current.

In this embodiment, the power control flowchart 8 and the voltage control flowchart 9 need to be simultaneously performed, because the effects can be achieved only when power control and voltage control are simultaneously performed.

In conclusion, both the control methods provided in Method embodiment 2 and Method embodiment 3 can implement that the inverter circuit maintains the constant output power and the constant bus voltage. It may be understood that both the control methods provided in Embodiment 2 and Embodiment 3 are applicable to the IV curve scanning process, that is, applicable during IV curve scanning.

Controlling a DC-DC circuit to perform IV curve scanning is a relatively mature technology. The following briefly describes the IV curve scanning, including: controlling an input voltage of each IV curve scanning DC-DC circuit to gradually change from an open-circuit voltage to a short-circuit voltage; recording the input voltage and a corresponding input current of each IV curve scanning DC-DC circuit in a process in which the input voltage of each IV curve scanning DC-DC circuit changes; and obtaining, based on the recorded input voltage and corresponding input current, an IV curve corresponding to each IV curve scanning DC-DC circuit.

It may be understood that the IV curve scanning is essentially scanning a photovoltaic string. However, because an output end of the photovoltaic string is connected to an input end of a DC-DC circuit, an output voltage and an output current of the photovoltaic string respectively correspond to an input voltage and an input current of the DC-DC circuit. For example, in FIG. 1, IV curve scanning is performed on the first photovoltaic string 101 and the second photovoltaic string 102 that correspond to the first DC-DC circuit 1, to obtain an input voltage of the first DC-DC circuit 1 and an output current of the first photovoltaic string 101, and then an IV curve of the first photovoltaic string 101 can be drawn. An IV curve of the second photovoltaic string 102 may be drawn in a similar manner.

In the control methods provided in the embodiments of this application, the non-IV curve scanning DC-DC circuit is controlled to operate in a bus voltage control mode or a complementary input power mode. An appropriate power may be extracted from a photovoltaic string on which IV curve scanning is not performed, to reduce an energy yield loss during the IV curve scanning. The inverter circuit is controlled to operate in a constant output power mode or a bus voltage control mode, to ensure that an output power of the string inverter maintains stable and does not fluctuate during the IV curve scanning. In this way, impact on stability of an alternating current power grid is reduced, and a power grid failure is avoided.

Based on the control methods for a string inverter provided in the foregoing embodiments, the embodiments of this application further provide a control apparatus for a string inverter. The following provides detailed descriptions with reference to the accompanying drawing.

Apparatus Embodiment

Figure 10:
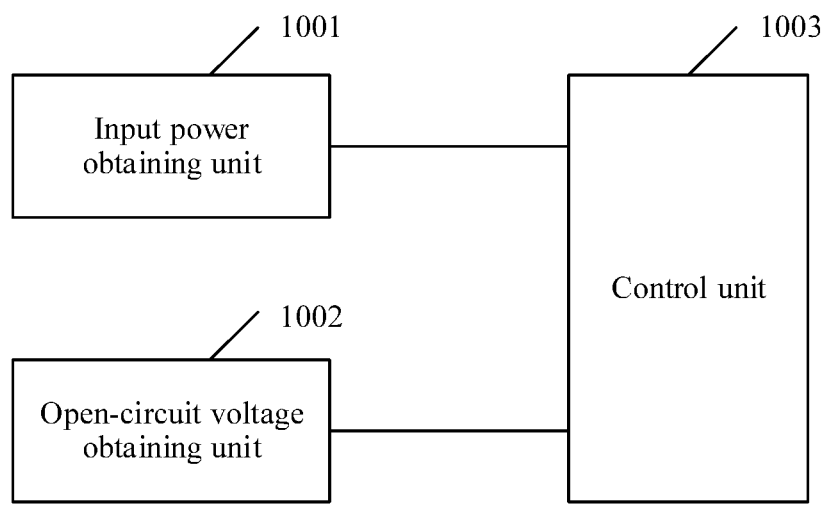
FIG. 10 is a schematic diagram of a control apparatus for a string inverter according to an embodiment of this application.

FIG. 10 is a schematic diagram of a control apparatus for a string inverter according to an embodiment of this application.

The control apparatus for a string inverter provided in this embodiment is applied to the string inverter. The string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit.

The control apparatus includes an input power obtaining unit 1001, an open-circuit voltage obtaining unit 1002, and a control unit 1003.

The input power obtaining unit 1001 is configured to obtain a sum of input powers of all non-IV curve scanning DC-DC circuits before IV curve scanning.

The open-circuit voltage obtaining unit 1002 is configured to obtain a maximum value in open-circuit voltages of all IV curve scanning DC-DC circuits.

An open-circuit voltage of a DC-DC circuit is an open-circuit voltage of a corresponding photovoltaic string, and the open-circuit voltage of the photovoltaic string is an input voltage of the corresponding DC-DC circuit.

A DC-DC circuit is usually a boost circuit, in other words, an output voltage of the DC-DC circuit is greater than or equal to an input voltage of the DC-DC circuit. The input voltage of the DC-DC circuit is an output voltage of a corresponding photovoltaic string. In a process of performing IV curve scanning on the photovoltaic string, the output voltage of the photovoltaic string is to be scanned from an open-circuit voltage to a short-circuit voltage. In other words, a maximum output voltage of the photovoltaic string is the open-circuit voltage. In this case, a maximum input voltage of the DC-DC circuit is the open-circuit voltage of the corresponding photovoltaic string. Therefore, the output voltage of the DC-DC circuit is greater than or equal to the open-circuit voltage of the corresponding photovoltaic string. In addition, the output ends of all the DC-DC circuits are connected together in parallel. In the IV curve scanning process, the output voltage of the DC-DC circuit needs to meet a condition that open-circuit voltages of all photovoltaic strings on which the IV curve scanning is performed can be scanned during the IV curve scanning. Therefore, $U_{bus\_ref}$ needs to be greater than or equal to the maximum value in the open circuit voltages. If $U_{bus\_ref}$ is less than the maximum value in the open circuit voltages, it cannot be ensured that the open-circuit voltages of all the photovoltaic strings on which the IV curve scanning is performed can be scanned during the IV curve scanning. Consequently, the IV curve scanning cannot be completed.

The control unit 1003 is configured to: in the IV curve scanning process, control an output power of the inverter circuit to be a specified power reference value, and control an output voltage of each non-IV curve scanning DC-DC circuit to be a specified voltage reference value, where the specified power reference value is less than or equal to the sum of the input powers, and the specified voltage reference value is greater than or equal to the maximum value in the open circuit voltages.

The control apparatus provided in this embodiment of this application controls the inverter circuit to maintain a constant output power and a constant bus voltage in the IV curve scanning process. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. The control apparatus provided in this embodiment of this application can control each non-IV curve scanning DC-DC circuit to continue to output a power. In this way, electric energy output by each non-IV curve scanning DC-DC circuit can be effectively utilized, and a huge energy yield loss can be avoided.

The following provides descriptions that the control apparatus controls the output power of the inverter circuit to be the specified power reference value and controls the output voltage of each non-IV curve scanning DC-DC circuit to be the specified voltage reference value. Because the output ends of all the DC-DC circuits are connected in parallel to the input end of the inverter circuit, the bus voltage is an output voltage of each DC-DC circuit, and is also an input voltage of the inverter circuit. In this way, controlling the bus voltage to maintain constant may be implemented by controlling the output voltage of each non-IV curve scanning DC-DC circuit to be the specified voltage reference value.

For example, the control unit includes: an inverter circuit output power obtaining subunit configured to obtain the output power of the inverter circuit; a first comparison subunit configured to compare the output power of the inverter circuit with the specified power reference value to obtain a power comparison result; a first proportional-integral regulation subunit configured to obtain a first current reference value of a d axis of the inverter circuit via a first proportional-integral regulator based on the power comparison result; and a first control subunit configured to control a current of the d axis of the inverter circuit based on the first current reference value of the d axis of the inverter circuit.

The control unit includes: a DC-DC circuit output voltage detection subunit configured to detect an output voltage of a DC-DC circuit m, where in the IV curve scanning process, a DC-DC circuit 1 to a DC-DC circuit K are IV curve scanning DC-DC circuits, a DC-DC circuit (K+1) to a DC-DC circuit N are non-IV curve scanning DC-DC circuits, and m=K+1, K+2, . . . , N; a second comparison subunit configured to compare the output voltage of the DC-DC circuit m with the specified voltage reference value to obtain a voltage comparison result; a second proportional-integral regulation subunit configured to obtain a feedback current regulation value of the DC-DC circuit m via a second proportional-integral regulator based on the voltage comparison result; a first current reference value obtaining subunit configured to use a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process; and a first current control subunit configured to control a current of the DC-DC circuit m based on the current reference value of the DC-DC circuit m, such that the output voltage of the DC-DC circuit m is the specified voltage reference value.

The following provides descriptions that the control apparatus controls a sum of a sum of input powers of all the IV curve scanning DC-DC circuits and the sum of the input powers of all the non-IV curve scanning DC-DC circuits to be the specified power reference value. This control manner is also referred to as a complementary power control mode. In this embodiment, controlling the bus voltage to maintain constant is implemented by controlling the input voltage of the inverter circuit to be the specified voltage reference value. The input voltage of the inverter circuit is equal to the output voltage of each non-IV curve scanning DC-DC circuit connected to the inverter circuit.

The control unit includes: a DC-DC circuit input power obtaining subunit configured to obtain a sum of input powers of all the IV curve scanning DC-DC circuits in the IV curve scanning process; an input power difference obtaining subunit configured to subtract the sum of the input powers of all the IV curve scanning DC-DC circuits from the specified power reference value to obtain an input power difference; and a power control subunit configured to control the sum of the input powers of all the non-IV curve scanning DC-DC circuits to be the input power difference.

The control unit includes: an inverter circuit input voltage obtaining subunit configured to obtain an input voltage of the inverter circuit, where the input voltage of the inverter circuit is equal to the output voltage of each non-IV curve scanning DC-DC circuit; a voltage comparison subunit configured to compare the input voltage of the inverter circuit with the specified voltage reference value to obtain a comparison result for the input voltage of the inverter circuit; a second current reference value obtaining subunit configured to obtain a second current reference value of a d axis of the inverter circuit via a third proportional-integral regulator based on the comparison result for the input voltage of the inverter circuit; and a second control subunit configured to control a current of the d axis of the inverter circuit based on the second current reference value of the d axis of the inverter circuit, such that the output voltage of each non-IV curve scanning DC-DC circuit is the specified voltage reference value.

For an implementation of the control apparatus, refer to detailed descriptions in the method embodiments.

In addition, controlling a DC-DC circuit to perform IV curve scanning is a relatively mature technology. The following briefly describes the IV curve scanning.

The control unit is further configured to: control an input voltage of each IV curve scanning DC-DC circuit to gradually change from an open-circuit voltage to a short-circuit voltage; record the input voltage and a corresponding input current of each IV curve scanning DC-DC circuit in a process in which the input voltage of each IV curve scanning DC-DC circuit changes; and obtain, based on the recorded input voltage and corresponding input current, an IV curve corresponding to each IV curve scanning DC-DC circuit.

The control apparatus provided in this embodiment of this application controls the non-IV curve scanning DC-DC circuit to operate in a bus voltage control mode or a complementary input power mode. An appropriate power may be extracted from a photovoltaic string on which IV curve scanning is not performed, to reduce an energy yield loss during the IV curve scanning. The inverter circuit is controlled to operate in a constant output power mode or a bus voltage control mode, to ensure that an output power of the string inverter maintains stable and does not fluctuate during the IV curve scanning. In this way, impact on stability of an alternating current power grid is reduced, and a power grid failure is avoided.

Controller Embodiment

Based on the control methods for a string inverter provided in the foregoing embodiments, this embodiment of this application further provides a controller for a string inverter. The following provides detailed descriptions with reference to the accompanying drawings.

The controller for a string inverter provided in this embodiment of this application is applied to the string inverter. The string inverter includes an inverter circuit and N DC-DC converter circuits, where N is an integer greater than or equal to 2, an input end of each DC-DC circuit is connected to a corresponding photovoltaic string, an output end of each DC-DC circuit is connected to an input end of the inverter circuit, and the N DC-DC circuits include a non-IV curve scanning DC-DC circuit and an IV curve scanning DC-DC circuit.

The controller is configured to perform the control methods described in Method embodiment 1 to Method embodiment 3.

For example, the controller is configured to: in an IV curve scanning process, control an output power of the inverter circuit to be a specified power reference value, and control an output voltage of each non-IV curve scanning DC-DC circuit to be a specified voltage reference value, where the specified power reference value is less than or equal to a sum of input powers of all non-IV curve scanning DC-DC circuits before IV curve scanning, and the specified voltage reference value is greater than or equal to a preset percentage of a maximum value in open-circuit voltages, before the IV curve scanning, of photovoltaic strings connected to all IV curve scanning DC-DC circuits.

The controller is further configured to obtain the sum of the input powers of all the non-IV curve scanning DC-DC circuits before the IV curve scanning.

An open-circuit voltage obtaining process includes: obtaining, before the IV curve scanning, a maximum value in input voltages of all the IV curve scanning DC-DC circuits when input currents of all the IV curve scanning DC-DC circuits are 0, where the maximum value in the input voltages of all the IV curve scanning DC-DC circuits is the maximum value in the open-circuit voltages of the photovoltaic strings connected to all the IV curve scanning DC-DC circuits.

That the controller controls an output power of the inverter circuit to be a specified power reference value includes: obtaining the output power of the inverter circuit; comparing the output power of the inverter circuit with the specified power reference value to obtain a power comparison result; obtaining a first current reference value of a d axis of the inverter circuit via a first proportional-integral regulator based on the power comparison result; and controlling a current of the d axis of the inverter circuit based on the first current reference value of the d axis of the inverter circuit.

That the controller controls an output voltage of each non-IV curve scanning DC-DC circuit to be a specified voltage reference value includes: detecting an output voltage of a DC-DC circuit m, where in the IV curve scanning process, a DC-DC circuit 1 to a DC-DC circuit K are IV curve scanning DC-DC circuits, a DC-DC circuit (K+1) to a DC-DC circuit N are non-IV curve scanning DC-DC circuits, and m=K+1, K+2, . . . , N; comparing the output voltage of the DC-DC circuit m with the specified voltage reference value to obtain a voltage comparison result; obtaining a feedback current regulation value of the DC-DC circuit m via a second proportional-integral regulator based on the voltage comparison result; using a sum of the feedback current regulation value and a feedforward current regulation value as a current reference value of the DC-DC circuit m, where the feedforward current regulation value is positively correlated with the specified power reference value, and is negatively correlated with a sum of powers of all the IV curve scanning DC-DC circuits in the IV curve scanning process; and controlling a current of the DC-DC circuit m based on the current reference value of the DC-DC circuit m, such that the output voltage of the DC-DC circuit m is the specified voltage reference value.

That the controller controls an output power of the inverter circuit to be a specified power reference value includes: obtaining a sum of input powers of all the IV curve scanning DC-DC circuits in the IV curve scanning process; subtracting the sum of the input powers of all the IV curve scanning DC-DC circuits from the specified power reference value to obtain an input power difference; and controlling the sum of the input powers of all the non-IV curve scanning DC-DC circuits to be the input power difference.

That the controller controls the sum of the input powers of all the non-IV curve scanning DC-DC circuits to be the input power difference includes: controlling an input power of a DC-DC circuit m in the non-IV curve scanning DC-DC circuits to be $P_{m\_ref}(t_3)$ according to the following formula, where m=K+1, K+2, . . . , N:

$$P_{m\_ref}(t_3) = K_{m\_pwr} \cdot \{\Sigma_{j=K+1}^{N} P_j(t_0) \cdot \alpha - \Sigma_{l=1}^{K}[U_l(t_3) \cdot I_l(t_3)]\},$$

where $K_{m\_pwr}$ represents a preset input power allocation factor of the DC-DC circuit m, $\Sigma_{m=K+1}^{N} K_{m\_pwr}=1$, $P_j(t_0)$ represents an input power of a DC-DC circuit before the IV curve scanning, and $U_l(t_3)$ and $I_l(t_3)$ respectively represent an input voltage and an input current of the DC-DC circuit in the IV curve scanning process.

That the controller controls an input power of a DC-DC circuit m to be $P_{m\_ref}(t_3)$ includes: obtaining an input voltage of the DC-DC circuit m in the IV curve scanning process; obtaining a current reference value of the DC-DC circuit m based on the input voltage of the DC-DC circuit m and the input power $P_{m\_ref}(t_3)$ of the DC-DC circuit m; and controlling a current of the DC-DC circuit m based on the current reference value of the DC-DC circuit m, such that the input power of the DC-DC circuit m is $P_{m\_ref}(t_3)$.

That the controller controls an output voltage of each non-IV curve scanning DC-DC circuit to be a specified voltage reference value includes: obtaining an input voltage of the inverter circuit, where the input voltage of the inverter circuit is equal to the output voltage of each non-IV curve scanning DC-DC circuit; comparing the input voltage of the inverter circuit with the specified voltage reference value to obtain a comparison result for the input voltage of the inverter circuit; obtaining a second current reference value of a d axis of the inverter circuit via a third proportional-integral regulator based on the comparison result for the input voltage of the inverter circuit; and controlling a current of the d axis of the inverter circuit based on the second current reference value of the d axis of the inverter circuit, such that the output voltage of each non-IV curve scanning DC-DC circuit is the specified voltage reference value.

In addition, the controller may interact with an upper management device, respond to an instruction that is used for performing IV curve scanning and that is sent by the upper management device, and send an obtained IV curve to the upper management device.

The controller controls the string inverter, including controlling the DC-DC circuits and the inverter circuit. For example, signals such as a current signal and a voltage signal that are measured via various sensors are used to control connection and disconnection of a switch component in the inverter circuit, such that the inverter circuit outputs required electric energy.

The controller provided in this embodiment of this application controls the inverter circuit to maintain a constant output power and a constant bus voltage in the IV curve scanning process. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. The controller provided in this embodiment of this application can control each non-IV curve scanning DC-DC circuit to continue to output a power. In this way, electric energy output by each non-IV curve scanning DC-DC circuit can be effectively utilized, and a huge energy yield loss can be avoided.

Photovoltaic Inverter System Embodiment 1

Based on the control methods for a string inverter and the controller for a string inverter that are provided in the foregoing embodiments, this embodiment of this application further provides a photovoltaic inverter system. The following provides detailed descriptions with reference to the accompanying drawing.

Figure 11:
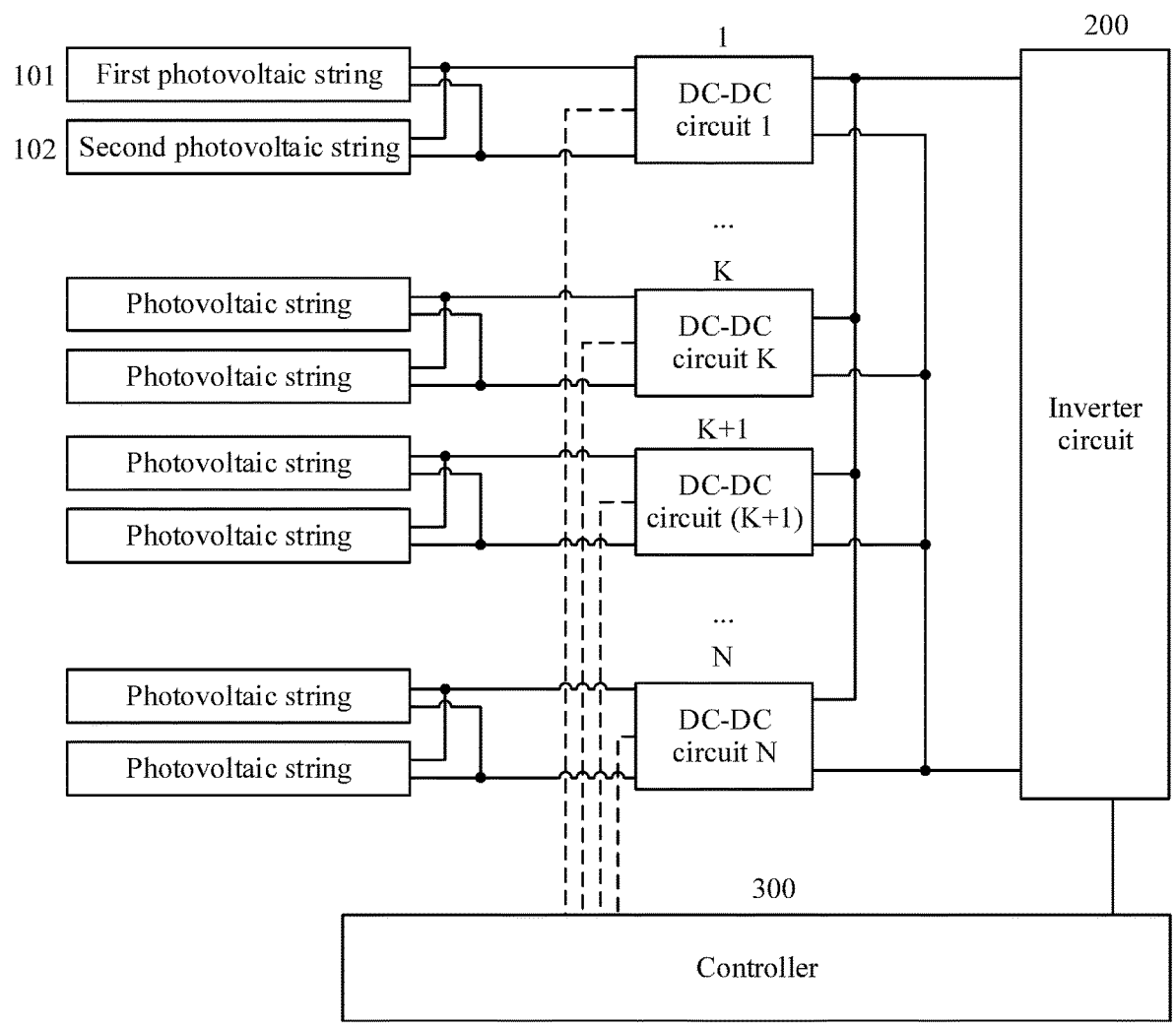
FIG. 11 is a schematic diagram of a photovoltaic inverter system according to an embodiment of this application.

FIG. 11 is a schematic diagram of a photovoltaic inverter system according to an embodiment of this application.

The photovoltaic inverter system provided in this embodiment includes a photovoltaic string and the string inverter provided in the foregoing embodiments.

The string inverter is configured to convert a direct current output by a DC-DC circuit into an alternating current.

The photovoltaic inverter system provided in this embodiment of this application controls the inverter circuit to maintain a constant output power and a constant bus voltage in an IV curve scanning process. In this way, no power fluctuation occurs on the string inverter, and stability of a power grid is maintained. In addition, because an output power of each IV curve scanning DC-DC circuit fluctuates, an output power of each non-IV curve scanning DC-DC circuit needs to be controlled not to be 0, to implement that the inverter circuit maintains the constant output power. The photovoltaic inverter system provided in this embodiment of this application can control each non-IV curve scanning DC-DC circuit to continue to output a power. In this way, electric energy output by each non-IV curve scanning DC-DC circuit can be effectively utilized, and a huge energy yield loss can be avoided.

Photovoltaic Inverter System Embodiment 2

Figure 12:
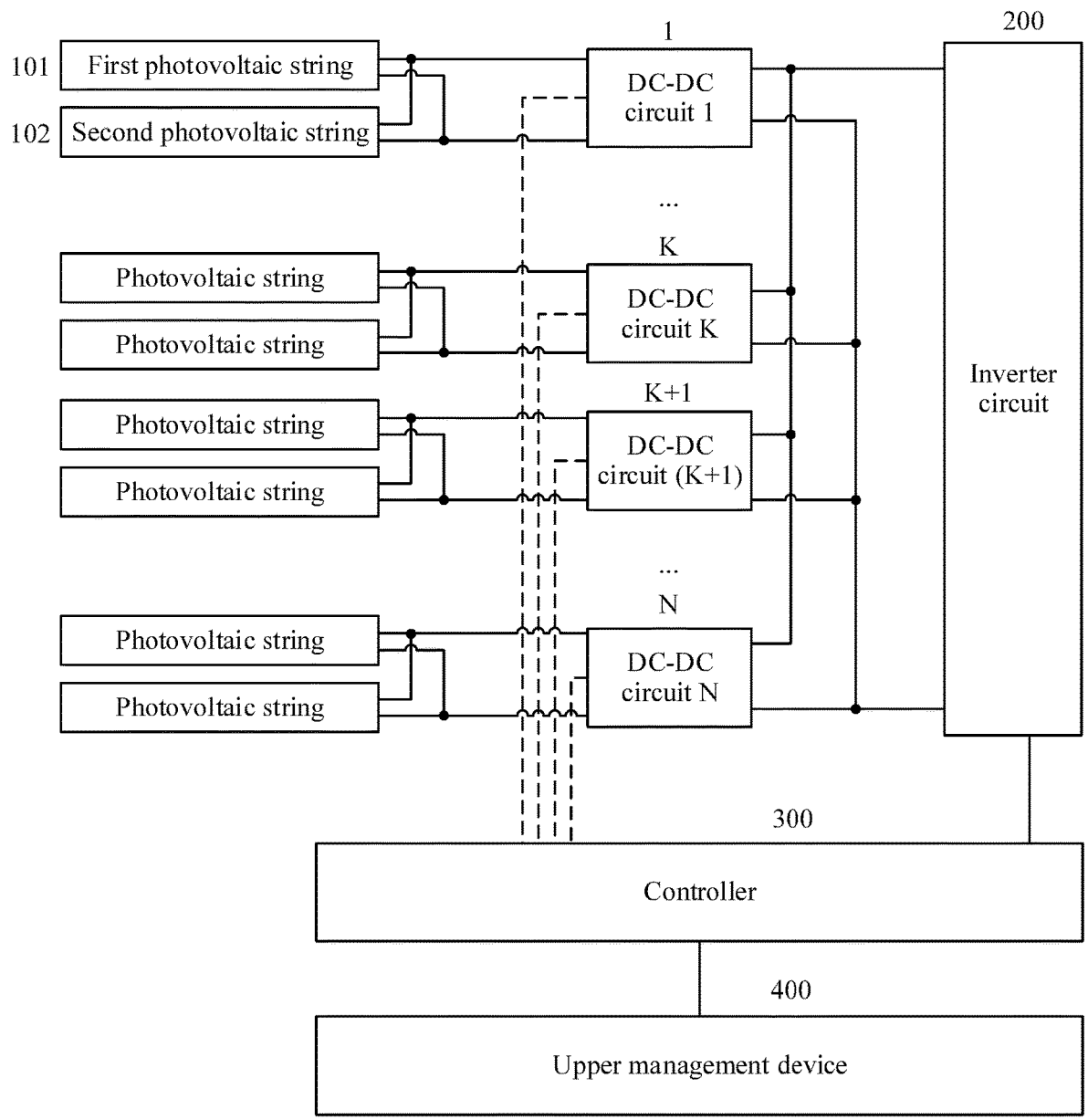
FIG. 12 is a schematic diagram of another photovoltaic inverter system according to an embodiment of this application.

FIG. 12 is a schematic diagram of another photovoltaic inverter system according to an embodiment of this application.

The photovoltaic inverter system provided in this embodiment further includes an upper management device 400.

The controller 300 is configured to: respond to an instruction that is used for performing IV curve scanning and that is sent by the upper management device 400, and send an obtained IV curve to the upper management device.

The photovoltaic inverter system provided in this embodiment may be a single-phase alternating current inverter system, or may be a three-phase alternating current inverter system.

The photovoltaic inverter system provided in this embodiment of this application controls a non-IV curve scanning DC-DC circuit to operate in a bus voltage control mode or a complementary input power mode. An appropriate power may be extracted from a photovoltaic string on which IV curve scanning is not performed, to reduce an energy yield loss during the IV curve scanning. The inverter circuit is controlled to operate in a constant output power mode or a bus voltage control mode, to ensure that an output power of the string inverter maintains stable and does not fluctuate during the IV curve scanning. In this way, impact on stability of an alternating current power grid is reduced, and a power grid failure is avoided.

In addition, an embodiment of this application further provides a computer-readable storage medium. The computer-readable storage medium is configured to store program code, and the program code is used to perform the control method for a string inverter in the foregoing method embodiments.

It should be understood that in this application, "at least one" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

The foregoing descriptions are merely example embodiments of the present disclosure, but are not intended to limit the present disclosure in any form. Although the present disclosure has been disclosed above using the example embodiments, the example embodiments are not intended to limit the present disclosure. According to the method and the technical content disclosed above, a person of ordinary skill in the art, under a circumstance without departing from the scope of the technical solutions of the present disclosure, can make a plurality of possible variations and modifications to the technical solutions of the present disclosure, or amend the technical solutions into embodiments with equal effects through equivalent variations. Therefore, any simple amendments, and equivalent variations and modifications that are made to the foregoing embodiments according to the technical essence of the present disclosure without departing from the content of the technical solutions of the present disclosure shall fall within the protection scope of the technical solutions of the present disclosure.

What is claimed is:

1. A control method for a string inverter, wherein the string inverter comprises an inverter circuit and N direct current (DC) to DC (DC-DC) converter circuits, wherein N is an integer greater than or equal to 2, wherein an input end of each DC-DC converter circuit is connected to a corresponding photovoltaic string, wherein an output end of each DC-DC converter circuit is connected to an input end of the inverter circuit, wherein the N DC-DC converter circuits comprise a non-current/voltage (non-IV) curve scanning DC-DC circuit and an IV curve scanning DC-DC circuit, and wherein the method comprises:
controlling an output power of the inverter circuit to be a specified power reference value during an IV curve scanning process; and
controlling an output voltage of each non-IV curve scanning DC-DC circuit to be a specified voltage reference value during the IV curve scanning process,
wherein the specified power reference value is less than or equal to a sum of input powers of all non-IV curve scanning DC-DC circuits before the IV curve scanning process, and
wherein the specified voltage reference value is greater than or equal to a preset percentage of a maximum value in open-circuit voltages, before the IV curve scanning process, of photovoltaic strings connected to all IV curve scanning DC-DC circuits.

2. The control method according to claim 1, wherein before the IV curve scanning process, the method further comprises obtaining the sum of the input powers of all the non-IV curve scanning DC-DC circuits.

3. The control method according to claim 1, wherein before the IV curve scanning process, the method further comprises obtaining a maximum value in input voltages of all the IV curve scanning DC-DC circuits when input currents of all the IV curve scanning DC-DC circuits are 0, wherein the maximum value in the input voltages is the maximum value in the open-circuit voltages of the photovoltaic strings.

4. The control method according to claim 1, wherein controlling the output power of the inverter circuit comprises:
obtaining the output power of the inverter circuit;
comparing the output power of the inverter circuit with the specified power reference value to obtain a power comparison result;

obtaining a first current reference value of a d-axis of the inverter circuit via a first proportional-integral regulator based on the power comparison result; and controlling a current of the d-axis based on the first current reference value of the d-axis.

5. The control method according to claim 1, wherein controlling the output voltage of each non-IV curve scanning DC-DC circuit comprises:

detecting an output voltage of a DC-DC circuit m, wherein a DC-DC circuit 1 to a DC-DC circuit K are IV curve scanning DC-DC circuits, wherein a DC-DC circuit (K+1) to a DC-DC circuit N are non-IV curve scanning DC-DC circuits, and wherein m=K+1, K+2, ..., N;

comparing the output voltage of the DC-DC circuit m with the specified voltage reference value to obtain a voltage comparison result;

obtaining a feedback current regulation value of the DC-DC circuit m via a second proportional-integral regulator based on the voltage comparison result;

using a sum of the feedback current regulation value and a feedforward current regulation value as a current reference value of the DC-DC circuit m, wherein the feedforward current regulation value is positively correlated with the specified power reference value, and is negatively correlated with a sum of powers of all the IV curve scanning DC-DC circuits during the IV curve scanning process; and controlling a current of the DC-DC circuit m based on the current reference value such that the output voltage of the DC-DC circuit m is the specified voltage reference value.

6. The control method according to claim 5, further comprising obtaining the feedforward current regulation value according to the following formula:

$$I_{m\_fdb}(t_3)=K_m \cdot \{P_{ref1}-\Sigma_{l=1}^{K}[U_l(t_3) \cdot I_l(t_3)]\}/U_{m_{in}}(t_3),$$

wherein $K_m$ represents a preset feedforward proportion coefficient, wherein $0 \leq K_m \leq 1$, wherein $P_{ref1}=\Sigma_{j=K+1}^{N} P_j(t_0) \cdot \alpha$, wherein $0<\alpha \leq 1$, wherein $t_0$ represents a moment before the IV curve scanning process, wherein $P_j(t_0)$ represents an input power of a DC-DC circuit before the IV curve scanning process, wherein $U_l(t_3)$ and $I_l(t_3)$ respectively represent an input voltage and an input current of the DC-DC circuit during the IV curve scanning process, and wherein $U_{m_{in}}(t_3)$ represents an input voltage of the DC-DC circuit m during the IV curve scanning process.

7. The control method according to claim 1, wherein controlling the output power of the inverter circuit comprises:

obtaining a second sum of input powers of all the IV curve scanning DC-DC circuits during the IV curve scanning process;

subtracting the second sum of the input powers from the specified power reference value to obtain an input power difference; and controlling the second sum of the input powers to be the input power difference.

8. The control method according to claim 7, wherein controlling the second sum of the input powers to be the input power difference comprises controlling an input power of a DC-DC circuit m in the non-IV curve scanning DC-DC circuits to be $P_{m\_ref}(t_3)$ according to the following formula:

$$P_{m\_ref}(t_3)=K_{m\_pwr} \cdot \{\Sigma_{j=K+1}^{N} P_j(t_0) \cdot \alpha - \Sigma_{l=1}^{K}[U_l(t_3) \cdot I_l(t_3)]\},$$

wherein m=K+1, K+2, ..., N, wherein $K_{m\_pwr}$ represents a preset input power allocation factor of the DC-DC circuit m, wherein $\Sigma_{m=K+1}^{N} K_{m\_pwr}=1$, wherein $P_j(t_0)$ represents an input power of a DC-DC circuit before the IV curve scanning process, and wherein $U_l(t_3)$ and $I_l(t_3)$ respectively represent an input voltage and an input current of the DC-DC circuit during the IV curve scanning process.

9. The control method according to claim 8, wherein controlling the input power of the DC-DC circuit m to be $P_{m\_ref}(t_3)$ comprises:

obtaining an input voltage of the DC-DC circuit m during the IV curve scanning process;

obtaining a current reference value of the DC-DC circuit m based on the input voltage of the DC-DC circuit m and the input power $P_{m\_ref}(t_3)$ of the DC-DC circuit m; and controlling a current of the DC-DC circuit m based on the current reference value such that the input power of the DC-DC circuit m is $P_{m\_ref}(t_3)$.

10. The control method according to claim 1, wherein controlling the output voltage of each non-IV curve scanning DC-DC circuit comprises:

obtaining an input voltage of the inverter circuit, wherein the input voltage is equal to the output voltage of each non-IV curve scanning DC-DC circuit;

comparing the input voltage with the specified voltage reference value to obtain a comparison result for the input voltage;

obtaining a second current reference value of a d axis of the inverter circuit via a third proportional-integral regulator based on the comparison result; and controlling a current of the d axis based on the second current reference value such that the output voltage of each non-IV curve scanning DC-DC circuit is the specified voltage reference value.

11. The control method according to claim 1, wherein the IV curve scanning process comprises:

controlling an input voltage of each IV curve scanning DC-DC circuit to gradually change from an open-circuit voltage to a short-circuit voltage;

recording the input voltage and a corresponding input current of each IV curve scanning DC-DC circuit in a process in which the input voltage of each IV curve scanning DC-DC circuit changes; and obtaining, based on the recorded input voltage and the corresponding input current, an IV curve corresponding to each IV curve scanning DC-DC circuit.

12. A controller for a string inverter, wherein the string inverter comprises an inverter circuit and N direct current (DC) to DC (DC-DC) converter circuits, wherein N is an integer greater than or equal to 2, wherein an input end of each DC-DC circuit is connected to a corresponding photovoltaic string, wherein an output end of each DC-DC circuit is connected to an input end of the inverter circuit, wherein the N DC-DC circuits comprise a non-current/voltage (non-IV) curve scanning DC-DC circuit and an IV curve scanning DC-DC circuit, and wherein the controller comprises:

a non-transitory storage medium storing computer-readable instructions; and a processor coupled to the non-transitory storage medium and configured to execute the computer-readable instructions to:

control an output power of the inverter circuit to be a specified power reference value during an IV curve scanning process; and control an output voltage of each non-IV curve scanning DC-DC circuit to be a specified voltage reference value during the IV curve scanning process,
wherein the specified power reference value is less than or equal to a sum of input powers of all non-IV curve scanning DC-DC circuits before the IV curve scanning process, and
wherein the specified voltage reference value is greater than or equal to a preset percentage of a maximum value in open-circuit voltages of all IV curve scanning DC-DC circuits before the IV curve scanning process.

13. The controller according to claim 12, wherein the controller is further configured to obtain the sum of the input powers before the IV curve scanning process.

14. The controller according to claim 13, wherein the controller controls the output voltage of each non-IV curve scanning DC-DC circuit to be the specified voltage reference value by:
obtaining an input voltage of the inverter circuit, where the input voltage is equal to the output voltage of each non-IV curve scanning DC-DC circuit;
comparing the input voltage with the specified voltage reference value to obtain a comparison result for the input voltage;
obtaining a second current reference value of a d axis of the inverter circuit via a third proportional-integral regulator based on the comparison result; and
controlling a current of the d axis based on the second current reference value such that the output voltage of each non-IV curve scanning DC-DC circuit is the specified voltage reference value.

15. The controller according to claim 12, wherein the controller is further configured to obtain, before the IV curve scanning process, a maximum value in input voltages of all the IV curve scanning DC-DC circuits when input currents of all the IV curve scanning DC-DC circuits are 0, wherein the maximum value in the input voltages is a maximum value in open-circuit voltages of photovoltaic strings connected to all the IV curve scanning DC-DC circuits.

16. The controller according to claim 12, wherein the controller controls the output power of the inverter circuit to be the specified power reference value by:
obtaining the output power of the inverter circuit;
comparing the output power of the inverter circuit with the specified power reference value to obtain a power comparison result;
obtaining a first current reference value of a d axis of the inverter circuit via a first proportional-integral regulator based on the power comparison result; and
controlling a current of the d axis based on the first current reference value of the d axis.

17. The controller according to claim 12, wherein the controller controls the output voltage of each non-IV curve scanning DC-DC circuit to be the specified voltage reference value by:
detecting an output voltage of a DC-DC circuit m, wherein a DC-DC circuit 1 to a DC-DC circuit K are IV curve scanning DC-DC circuits, wherein a DC-DC circuit (K+1) to a DC-DC circuit N are non-IV curve scanning DC-DC circuits, and wherein m=K+1, K+2, ..., N;
comparing the output voltage of the DC-DC circuit m with the specified voltage reference value to obtain a voltage comparison result;
obtaining a feedback current regulation value of the DC-DC circuit m via a second proportional-integral regulator based on the voltage comparison result;
using a sum of the feedback current regulation value and a feedforward current regulation value as a current reference value of the DC-DC circuit m, wherein the feedforward current regulation value is positively correlated with the specified power reference value, and is negatively correlated with a sum of powers of all the IV curve scanning DC-DC circuits in the IV curve scanning process; and
controlling a current of the DC-DC circuit m based on the current reference value such that the output voltage of the DC-DC circuit m is the specified voltage reference value.

18. The controller according to claim 12, wherein the controller controls the output power of the inverter circuit to be the specified power reference value by:
obtaining a second sum of input powers of all the IV curve scanning DC-DC circuits;
subtracting the second sum of the input powers from the specified power reference value to obtain an input power difference; and
controlling the second sum of the input powers to be the input power difference.

19. The controller according to claim 18, wherein the controller controls the second sum of the input powers to be the input power difference by controlling an input power of a DC-DC circuit m in the non-IV curve scanning DC-DC circuits to be $P_{m\_ref}(t_3)$ according to the following formula:

$$P_{m\_ref}(t_3)=K_{m\_pwr}\cdot\{\Sigma_{j=K+1}^{N}P_j(t_0)\cdot\alpha-\Sigma_{l=1}^{K}[U_l(t_3)\cdot I_l(t_3)]\},$$

wherein m=K+1, K+2, ..., N, wherein $K_{m\_pwr}$ represents a preset input power allocation factor of the DC-DC circuit m, wherein $\Sigma_{m=K+1}^{N} K_{m\_pwr}=1$, wherein $P_j(t_0)$ represents an input power of a DC-DC circuit before the IV curve scanning process, and wherein $U_l(t_3)$ and $I_l(t_3)$ respectively represent an input voltage and an input current of the DC-DC circuit during the IV curve scanning process.

20. The controller according to claim 19, wherein the controller controls the input power of the DC-DC circuit m to be $P_{m\_ref}(t_3)$ by:
obtaining an input voltage of the DC-DC circuit m;
obtaining a current reference value of the DC-DC circuit m based on the input voltage of the DC-DC circuit m and the input power $P_{m\_ref}(t_3)$ of the DC-DC circuit m; and
controlling a current of the DC-DC circuit m based on the current reference value such that the input power of the DC-DC circuit m is $P_{m\_ref}(t_3)$.

* * * * *